US011849239B2

(12) United States Patent
Yamazaki

(10) Patent No.: US 11,849,239 B2
(45) Date of Patent: Dec. 19, 2023

(54) PHOTOELECTRIC CONVERSION DEVICE AND IMAGING SYSTEM

(71) Applicant: CANON KABUSHIKI KAISHA, Tokyo (JP)

(72) Inventor: Kazuo Yamazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 17/690,930

(22) Filed: Mar. 9, 2022

(65) Prior Publication Data
US 2022/0303491 A1 Sep. 22, 2022

(30) Foreign Application Priority Data

Mar. 16, 2021 (JP) ................................. 2021-042595

(51) Int. Cl.
H04N 25/772 (2023.01)
G06T 7/50 (2017.01)
H04N 25/766 (2023.01)
H04N 25/778 (2023.01)

(52) U.S. Cl.
CPC ............ H04N 25/772 (2023.01); G06T 7/50 (2017.01); H04N 25/766 (2023.01); H04N 25/778 (2023.01)

(58) Field of Classification Search
CPC .. H04N 25/772; H04N 25/766; H04N 25/778; H04N 25/75; H04N 25/60; G06T 7/50
See application file for complete search history.

(56) References Cited

U.S. PATENT DOCUMENTS

| 2014/0124651 A1 | 5/2014 | Nakahara |
| 2015/0162925 A1* | 6/2015 | Lee ..................... H03M 1/1295 250/208.1 |
| 2018/0274917 A1* | 9/2018 | Imaki ..................... G01C 3/085 |
| 2021/0314314 A1 | 10/2021 | Caldwell |

FOREIGN PATENT DOCUMENTS

| JP | 2014096670 A | 5/2014 |
| JP | 2019140464 A | 8/2019 |
| JP | 2019165313 A | 9/2019 |
| JP | 2020205517 A | 12/2020 |

* cited by examiner

Primary Examiner — Michael E Teitelbaum
(74) Attorney, Agent, or Firm — CANON U.S.A., INC. IP Division

(57) ABSTRACT

The photoelectric conversion device includes a plurality of pixels arranged to form a plurality of columns, a plurality of AD conversion circuits provided corresponding to the plurality of columns, and a control circuit configured to control the AD conversion circuits. The plurality of pixels includes an OB pixel arranged in a first column and an effective pixel arranged in a second column. The plurality of AD conversion circuits each include a first AD conversion circuit including a first comparator receiving a signal of the OB pixel, and a second AD conversion circuit including a second comparator receiving a signal of the effective pixel. The control circuit controls the first and second comparators such that the result of the AD conversion by the first AD conversion circuit is determined earlier than the result of the AD conversion by the second AD conversion circuit for signals of the same level.

21 Claims, 11 Drawing Sheets

PHOTOELECTRIC CONVERSION DEVICE AND IMAGING SYSTEM

BACKGROUND

Field of the Disclosure

The aspect of the embodiments relates to a photoelectric conversion device and an imaging system.

Description of the Related Art

Some photoelectric conversion devices such as CMOS image sensors perform analog-to-digital (AD) conversion on pixel signals and output the converted signals. In these photoelectric conversion devices, each of a plurality of comparators provided corresponding to a pixel column compares a pixel signal output from a pixel of a corresponding column with a reference signal, and outputs a comparison signal in accordance with a result of the comparison. By memorizing the digital value of a counter into a memory at the timing when the comparison signal is output, AD conversion of the pixel signal may be performed. Japanese Patent Application Laid-Open No. 2014-096670 discloses a technique for suppressing noise caused by the output levels of comparators provided in respective columns being simultaneously inverted.

The influence of noise caused by the simultaneous inversion of the output levels of the comparators is particularly significant in the horizontal OB pixels, and the influence on the image quality is also great. However, in Japanese Patent Application Laid-Open No. 2014-096670, the horizontal OB pixels and the effective pixels are not distinguished from each other. Therefore, in the technique of Japanese Patent Application Laid-Open No. 2014-096670, it is not always possible to sufficiently improve the image quality.

SUMMARY OF THE DISCLOSURE

According to one aspect of the embodiments, there is provided a photoelectric conversion device including a pixel array unit in which a plurality of pixels each including a photoelectric conversion element are arranged to form a plurality of columns, a plurality of AD conversion circuits provided corresponding to the plurality of columns, and a control circuit configured to control the plurality of AD conversion circuits, wherein the plurality of pixels includes a first pixel arranged in a first column of the plurality of columns and in which the photoelectric conversion element is shielded from light, and a second pixel arranged in a second column of the plurality of columns and in which light is incident on the photoelectric conversion element, wherein the plurality of AD conversion circuits includes a first AD conversion circuit including a first comparator that receives a signal of the first pixel, and a second AD conversion circuit including a second comparator that receives a signal of the second pixel, and wherein the control circuit is configured to control the first comparator and the second comparator such that a result of AD conversion by the first AD conversion circuit is determined earlier than a result of AD conversion by the second AD conversion circuit with respect to a signal of the same level.

According to another aspect of the embodiments, there is provided a photoelectric conversion device including a pixel array unit in which a plurality of pixels each including a photoelectric conversion element are arranged to form a plurality of columns, and a plurality of AD conversion circuits provided corresponding to the plurality of columns, wherein the plurality of pixels includes a first pixel arranged in a first column of the plurality of columns and in which the photoelectric conversion element is shielded from light, and a second pixel arranged in a second column of the plurality of columns and in which light is incident on the photoelectric conversion element, wherein the plurality of AD conversion circuits includes a first AD conversion circuit including a first comparator that receives a signal of the first pixel, and a second AD conversion circuit including a second comparator that receives a signal of the second pixel, and wherein a slew rate of the first comparator is higher than a slew rate of the second comparator.

Further features of the disclosure will become apparent from the following description of exemplary embodiments with reference to the attached drawings.

DESCRIPTION OF THE EMBODIMENTS

Exemplary embodiments of the disclosure will now be described in detail in accordance with the accompanying drawings.

First Embodiment

Figure 1:
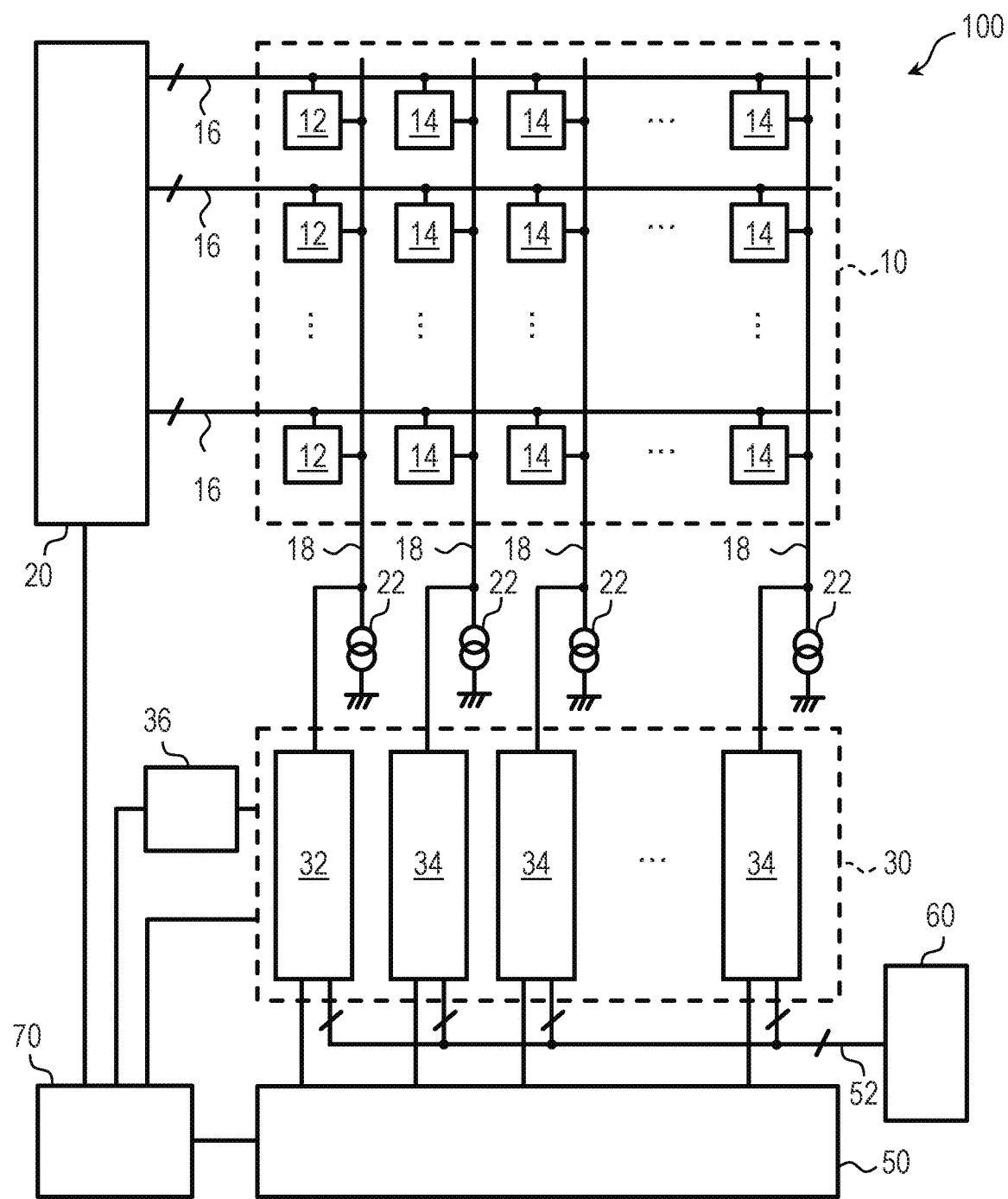
FIG. 1 is a block diagram illustrating a schematic configuration of a photoelectric conversion device according to a first embodiment of the disclosure.
Figure 2:
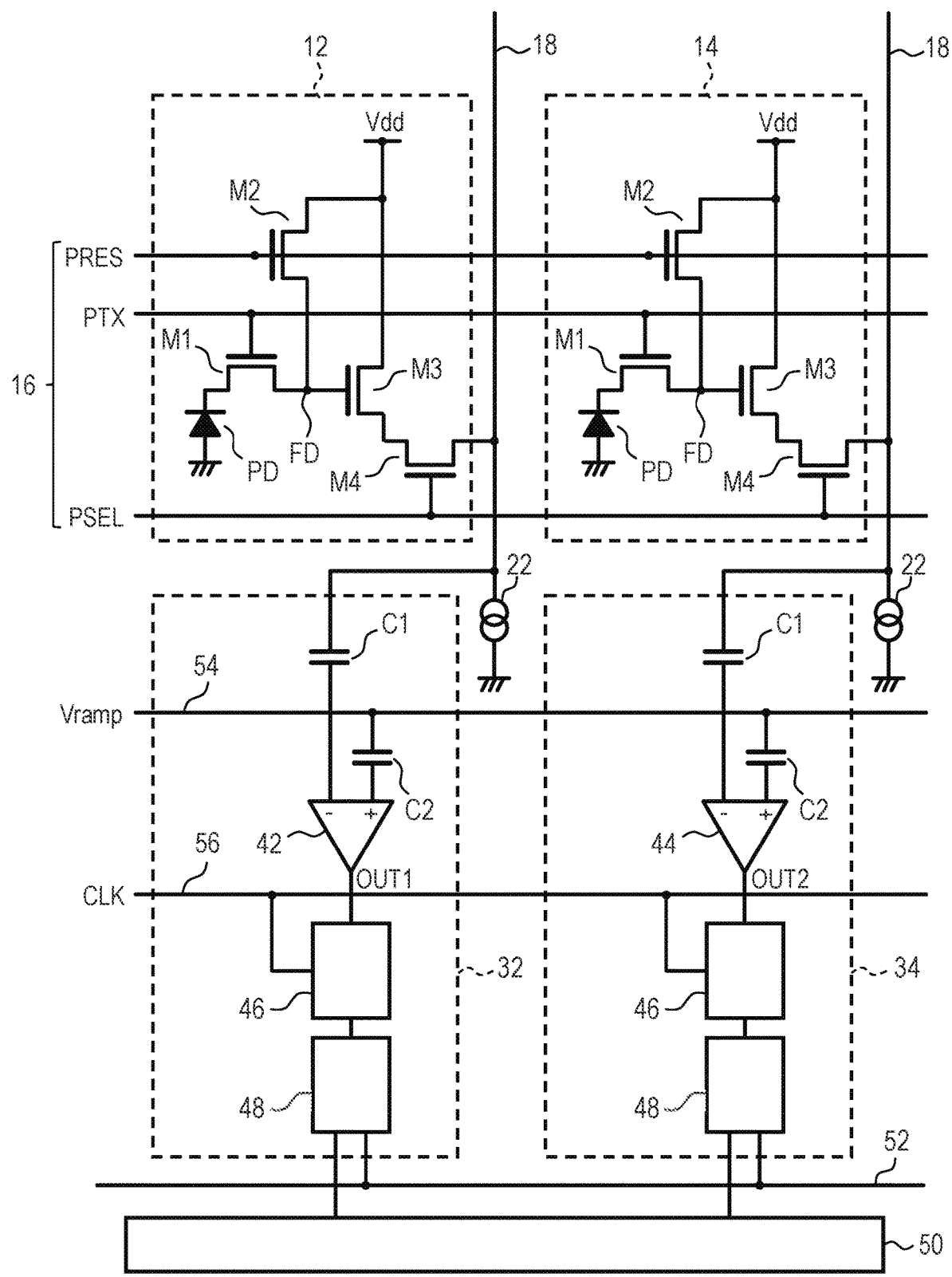
FIG. 2 is a circuit diagram illustrating a configuration example of a pixel and a column circuit in the photoelectric conversion device according to the first embodiment of the disclosure.
Figure 3:
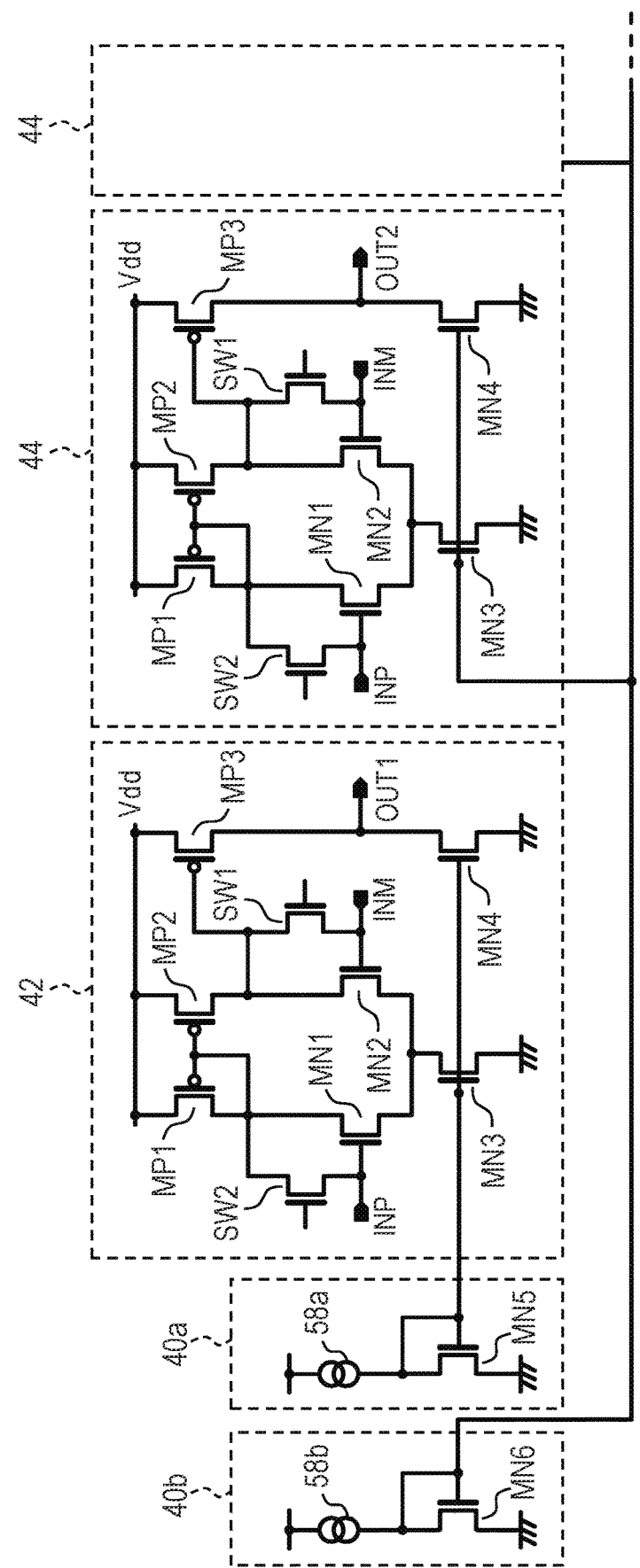
FIG. 3 is a circuit diagram illustrating a configuration example of a comparator in the photoelectric conversion device according to the first embodiment of the disclosure.
Figure 4:
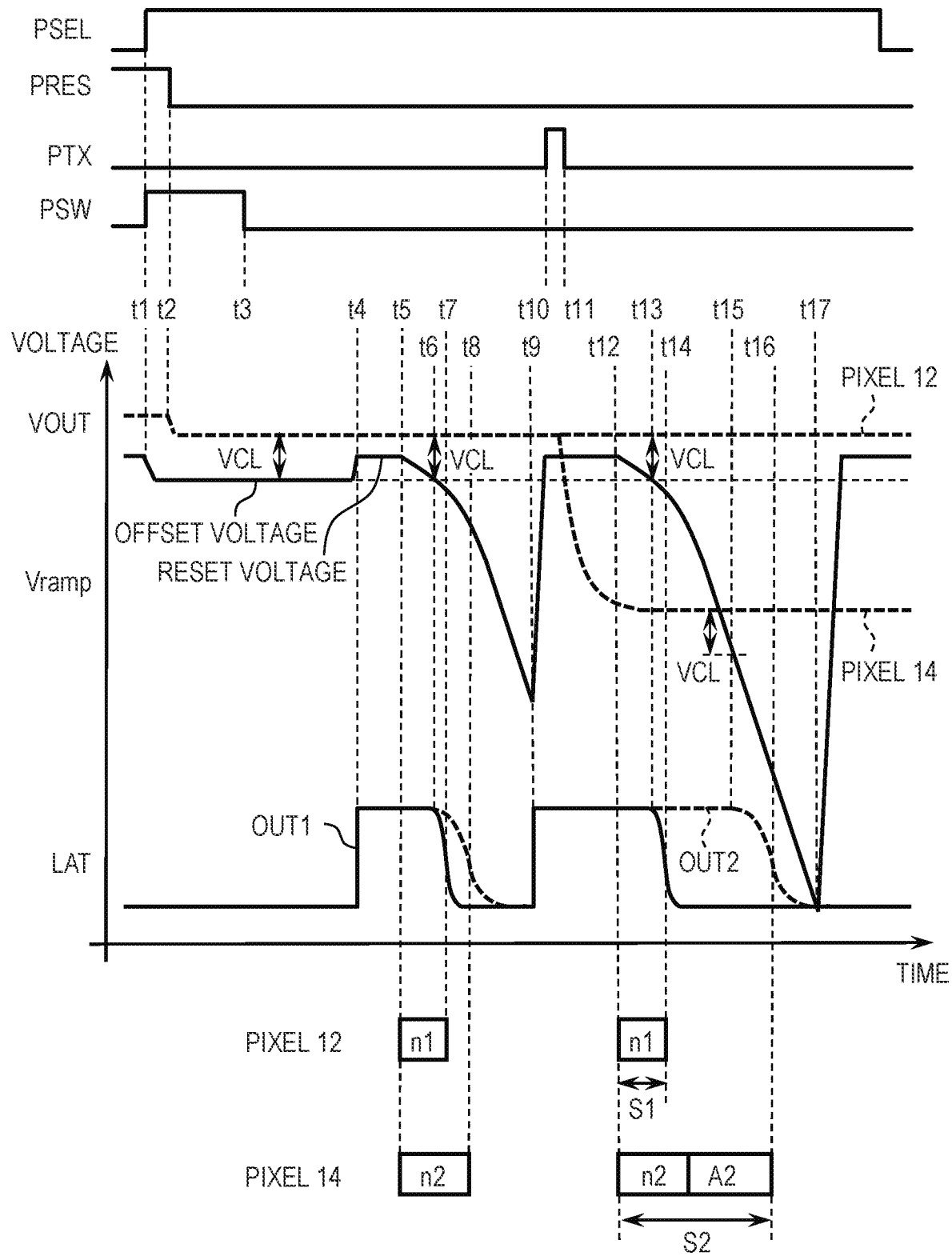
FIG. 4 is a timing chart illustrating the operation of the photoelectric conversion device according to the first embodiment of the disclosure.

A photoelectric conversion device and a method of driving the same according to a first embodiment of the disclosure will be described with reference to FIG. 1 to FIG. 4. FIG. 1 is a block diagram illustrating a schematic configuration of a photoelectric conversion device according to the present embodiment. FIG. 2 is a circuit diagram illustrating a configuration example of a pixel and a column circuit in the photoelectric conversion device according to the present embodiment. FIG. 3 is a circuit diagram illustrating a configuration example of a comparator in the photoelectric conversion device according to the present embodiment. FIG. 4 is a timing chart illustrating the operation of the photoelectric conversion device according to the present embodiment.

First, a schematic configuration of a photoelectric conversion device according to a first embodiment of the disclosure will be described with reference to FIG. 1.

As illustrated in FIG. 1, the photoelectric conversion device 100 according to the present embodiment may include a pixel array unit 10, a vertical scanning circuit 20, a readout circuit 30, a reference signal generation circuit 36, a horizontal scanning circuit 50, a digital signal processing circuit 60, and a timing generator 70.

The pixel array unit 10 is provided with a plurality of pixels 12 and 14 arranged in a matrix over a plurality of rows and a plurality of columns. Each of the pixels 12 and 14 includes a photoelectric conversion unit formed of a photoelectric conversion element such as a photodiode. The pixel 14 is an effective pixel that outputs a pixel signal corresponding to the amount of light incident on the photoelectric conversion element when light is incident on the photoelectric conversion element. The pixel 12 is an optical black pixel (OB pixel) in which the photoelectric conversion element is shielded from light, and an output signal thereof is used as a reference of a black level.

The pixels 12 are arranged in a part of rows and/or a part of columns among a plurality of rows and a plurality of columns constituting the pixel array unit 10, and generally, in a row and a column in contact with two sides around the pixel array unit 10. A column in which the pixels 12 are arranged may be referred to as a horizontal OB pixel region, and a pixel arranged in the horizontal OB pixel region may be referred to as a horizontal OB pixel. A row in which the pixels 12 are arranged may be referred to as a vertical OB pixel region, and a pixel arranged in the vertical OB pixel region may be referred to as a vertical OB pixel. FIG. 1 illustrates an example in which the pixels 12 are arranged in the leftmost column (first column) of the plurality of columns of the pixel array unit 10 and the pixels 14 are arranged in the other columns (second column to N-th column) for simplification of the drawing, but the horizontal OB pixel region is typically constituted by a plurality of columns.

At least one pixel 12 and a plurality of pixels 14 are arranged in each of the plurality of rows of the pixel array unit 10. The reference signal output from the pixel 12 is used for correction processing of pixel signals output from the pixels 14 in the same row.

In each row of the pixel array unit 10, a control line 16 is arranged so as to extend in a first direction (a lateral direction in FIG. 1). Each of the control lines 16 is connected to each of the pixels 12 and 14 arranged in the first direction, and forms a signal line common to these pixels 12 and 14. The first direction in which the control lines 16 extend may be referred to as a row direction or a horizontal direction. The control line 16 is connected to the vertical scanning circuit 20.

In each column of the pixel array unit 10, an output line 18 is arranged so as to extend in a second direction (vertical direction in FIG. 1) intersecting the first direction. Each of the output lines 18 is connected to the pixels 12 or 14 aligned in the second direction, and forms a signal line common to these pixels 12 or 14. The second direction in which the output lines 18 extend may be referred to as a column direction or a vertical direction. Each of the output lines 18 is connected to a current source 22 and a readout circuit 30.

The vertical scanning circuit 20 is a control circuit having a function of receiving a control signal output from the timing generator 70, generating a control signal for driving the pixels 12 and 14, and supplying the control signal to the pixels 12 and 14 via the control lines 16. A logic circuit such as a shift register or an address decoder may be used for the vertical scanning circuit 20. The vertical scanning circuit 20 drives the pixels 12 and 14 of the pixel array unit 10 in units of rows. The signals read out from the pixels 12 and 14 on a row-by-row basis are input to the readout circuit 30 via the output lines 18 provided in the respective columns of the pixel array unit 10.

The readout circuit 30 includes a plurality of column circuits 32 and 34 provided corresponding to the respective columns of the pixel array unit 10. The column circuit 32 is connected to an output line 18 of a column (first column) in which the pixels 12 are arranged. The column circuit 34 is connected to an output line 18 of a column (from the second column to the N-th column) in which the pixels 14 are arranged. Each of the column circuits 32 and 34 has a function as an AD conversion circuit that performs AD conversion on the analog pixel signal output from the output line 18 of the corresponding column, and a function as a digital signal holding unit that holds the digital pixel signal after AD conversion.

The reference signal generation circuit 36 is a circuit that receives a control signal output from the timing generator 70 and generates a reference signal to be supplied to the column circuits 32 and 34. The reference signal is a signal having a predetermined amplitude, and may be, for example, a signal whose signal level (the magnitude of the signal) changes with lapse of time. The reference signal is typically a ramp signal. The ramp signal is a signal in which the signal level monotonically changes with lapse of time, for example, a signal in which the output voltage monotonically decreases or monotonically increases with lapse of time. The reference signal is not particularly limited as long as it has an amplitude applicable to AD conversion.

The horizontal scanning circuit 50 is a control circuit that supplies a control signal for sequentially transferring the pixel signals processed by the readout circuit 30 to the digital signal processing circuit 60 for each column to the readout circuit 30. The horizontal scanning circuit 50 may be configured using a shift register or an address decoder.

The digital signal processing circuit 60 is a processing circuit that performs predetermined processing on the digital pixel signal transferred from the readout circuit 30. Examples of the signal processing performed by the digital signal processing circuit 60 include correction processing by digital correlated double sampling and amplification processing.

The timing generator 70 is a control circuit for supplying control signals for controlling the operations and timings of the vertical scanning circuit 20, the readout circuit 30, the reference signal generation circuit 36, and the horizontal scanning circuit 50. At least a part of the control signals supplied to the vertical scanning circuit 20, the readout circuit 30, the reference signal generation circuit 36, and the horizontal scanning circuit 50 may be supplied from the outside of the photoelectric conversion device 100.

Next, a configuration example of the pixels 12 and 14 and the column circuits 32 and 34 in the photoelectric conversion device according to the present embodiment will be described with reference to FIG. 2.

In FIG. 2, among the plurality of pixels 12 and 14 constituting the pixel array unit 10, the pixels 12 and 14 arranged in the same row are extracted and illustrated one by one. FIG. 2 also illustrates a column circuit 32 connected to the pixel 12 and a column circuit 34 connected to the pixel 14.

As illustrated in FIG. 2, each of the pixels 12 and 14 may include a photoelectric conversion element PD, a transfer transistor M1, a reset transistor M2, an amplifier transistor M3, and a select transistor M4.

The photoelectric conversion element PD is, for example, a photodiode, and has an anode connected to a ground node and a cathode connected to a source of the transfer transistor M1. A drain of the transfer transistor M1 is connected to a source of the reset transistor M2 and a gate of the amplifier transistor M3. A node FD to which the drain of the transfer transistor M1, the source of the reset transistor M2, and the gate of the amplifier transistor M3 are connected is a so-called floating diffusion. The floating diffusion includes a capacitance component (floating diffusion capacitor) and functions as a charge holding portion. The floating diffusion capacitor includes a p-n junction capacitor, an interconnection capacitor, and the like.

A drain of the reset transistor M2 and a drain of the amplifier transistor M3 are connected to a power supply voltage node to which the voltage Vdd is supplied. A source of the amplifier transistor M3 is connected to a drain of the select transistor M4. A source of the select transistor M4 is connected to the output line 18.

The pixel 12 and the pixel 14 have the same circuit configuration as illustrated in FIG. 2. The pixel 12 is different from the pixel 14 in that the photoelectric conversion element PD is shielded from light by a light shielding film (not illustrated).

A current source 22 and a column circuit 32 are connected to the output line 18 connected to the pixel 12. The current source 22 and the column circuit 34 are connected to the output line 18 connected to the pixel 14. The current source 22 may be a current source whose current value may be switched, or may be a constant current source whose current value is constant.

In the pixel configuration of FIG. 2, the control line 16 in each row includes a signal line connected to the gate of the transfer transistor M1, a signal line connected to the gate of the reset transistor M2, and a signal line connected to the gate of the select transistor M4. A control signal PTX is supplied from the vertical scanning circuit 20 to the gate of the transfer transistor M1. A control signal PRES is supplied from the vertical scanning circuit 20 to the gate of the reset transistor M2. A control signal PSEL is supplied from the vertical scanning circuit 20 to the gate of the select transistor M4. The pixels 12 and the pixels 14 in the same row are connected to a common signal line, and are controlled simultaneously by a common control signal.

In the present embodiment, a case where electrons of electron-hole pairs generated in the photoelectric conversion element PD by light incidence are used as signal charge will be described. When electrons are used as the signal charge, the transistors constituting the pixels 12 and 14 may be formed of n-channel MOS transistors. When each transistor is formed of an n-channel MOS transistor, the corresponding transistor is turned on when a high-level control signal is supplied from the vertical scanning circuit 20. When the control signal of the Low level is supplied from the vertical scanning circuit 20, the corresponding transistor is turned off. However, the signal charge is not limited to electrons, and holes may be used as the signal charge. When holes are used as signal charge, the conductivity type of each transistor is opposite to that described in the present embodiment. The source and drain of a MOS transistor may differ depending on the conductivity type of the transistor and the function of interest. Some or all of the names of a source and a drain used in this embodiment may be referred to as reverse names.

The column circuit 32 includes capacitors C1 and C2, a comparator 42, a counter circuit 46, and a memory unit 48. One electrode of the capacitor C1 is connected to the output line 18. The other electrode of the capacitor C1 is connected to an inverting input terminal of the comparator 42. One electrode of the capacitor C2 is connected to a signal line 54. The other electrode of the capacitor C2 is connected to a non-inverting input terminal of the comparator 42. The counter circuit 46 has two input terminals and one output terminal. An output terminal of the comparator 42 is connected to a first input terminal of the counter circuit 46. A second input terminal of the counter circuit 46 is connected to a signal line 56. The memory unit 48 has two input terminals and one output terminal. An output terminal of the counter circuit 46 is connected to a first input terminal of the memory unit 48. A second input terminal of the memory unit 48 is connected to the horizontal scanning circuit 50. An output terminal of the memory unit 48 is connected to an output line 52.

The signal line 54 is connected to the reference signal generation circuit 36. The reference signal Vramp is supplied to the signal line 54 from the reference signal generation circuit 36. The signal line 56 is connected to the timing generator 70. A clock signal CLK is supplied to the signal line 56 from the timing generator 70.

As illustrated in FIG. 2, the column circuit 34 has the same circuit configuration as the column circuit 32. For convenience of description later, the comparator of the column circuit 32 is denoted by reference numeral 42, and the comparator of the column circuit 34 is denoted by reference numeral 44.

Next, an outline of the operation of the pixels 12 and 14 and the column circuits 32 and 34 will be described with reference to FIG. 2. Although the operation of the pixel 14 and the column circuit 34 is described here, the same applies to the operation of the pixel 12 and the column circuit 32.

The photoelectric conversion element PD converts incident light into an amount of charge corresponding to the amount of light (photoelectric conversion). When the transfer transistor M1 is turned on, the charge held by the photoelectric conversion element PD is transferred to the node FD. The charge transferred from the photoelectric conversion element PD is held in the capacitance component (floating diffusion capacitor) coupled to the node FD. As a result, the node FD becomes a potential corresponding to the amount of charge transferred from the photoelectric conversion element PD by charge-voltage conversion by the floating diffusion capacitor.

When the select transistor M4 is turned on, the amplifier transistor M3 is connected to the output line 18. The amplifier transistor M3 has a configuration in which a voltage Vdd is supplied to the drain thereof and a bias current is supplied to the source thereof from the current source 22 via the select transistor M4, and constitutes an amplifier (source follower circuit) having a gate as an input node. Thus, the amplifier transistor M3 outputs a signal based on the voltage of the node FD to the output line 18 via the select transistor M4. In this sense, the amplifier transistor M3 and the select transistor M4 are an output unit that outputs pixel signal corresponding to the amount of charge held in the node FD.

The reset transistor M2 has a function of controlling the supply of a voltage (voltage Vdd) for resetting the node FD as the charge holding unit to the FD node. When the reset transistor M2 is turned on, the node FD is reset to a voltage corresponding to the voltage Vdd.

The pixel signal input from the pixel 14 to the column circuit 34 via the output line 18 is input to the inverting input terminal of the comparator 44 via the capacitor C1. The reference signal Vramp output from the reference signal generation circuit 36 is input to the non-inverting input terminal of the comparator 44 via the signal line 54 and the capacitor C2. The comparator 44 performs a comparison operation of comparing the signal level of the pixel signal and the signal level of the reference signal Vramp supplied from the reference signal generation circuit 36, and outputs a latch signal at a timing when the signal level of the pixel signal and the signal level of the reference signal Vramp satisfy a predetermined relationship. The output signal of the comparator 44 is input to the counter circuit 46.

The counter circuit 46 starts counting pulses superimposed on the clock signal CLK supplied from the timing generator 70 via the signal line 56 in synchronization with the start of the comparison operation between the signal level of the pixel signal and the signal level of the reference signal Vramp in the comparator 44. When the counter circuit 46 receives the latch signal from the comparator 44, the counter circuit 46 outputs the count value held at the timing of receiving the latch signal to the memory unit 48. The memory unit 48 holds the count value received from the counter circuit 46 as digital data of the pixel signal.

Under the control of the timing generator 70, the horizontal scanning circuit 50 sequentially outputs control signals to the memory unit 48 of the column circuit of each column. The memory unit 48 that has received the control signal from the horizontal scanning circuit 50 outputs digital data of the pixel signal to the output line 52.

Next, a configuration example of the comparators 42 and 44 in the photoelectric conversion device according to the present embodiment will be described with reference to FIG. 3.

The comparator 42 may include p-channel transistors MP1, MP2, MP3 and n-channel transistors MN1, MN2, MN3, MN4.

Sources of the p-channel transistors MP1, MP2, and MP3 are connected to a power supply voltage node (voltage Vdd). Gates of the p-channel transistors MP1 and MP2 and a drain of the p-channel transistor MP1 are connected to a drain of the n-channel transistor MN1. A drain of the p-channel transistor MP2 is connected to a gate of the p-channel transistor MP3 and a drain of the n-channel transistor MN2. Sources of the n-channel transistors MN1 and MN2 are connected to a drain of the n-channel transistor MN3. A source of the n-channel transistor MN3 is connected to the reference voltage node. A drain of the p-channel transistor MP3 is connected to a drain of the n-channel transistor MN4. A source of the n-channel transistor MN4 is connected to the reference voltage node.

A gate of the n-channel transistor MN1 is a non-inverting input terminal (INP) of the comparator 42. A gate of the n-channel transistor MN2 is an inverting input terminal (INM) of the comparator 42. A connection node between the drain of the p-channel transistor MP3 and the drain of the n-channel transistor MN4 is an output terminal (OUT1) of the comparator 42.

A switch SW1 is connected between the inverting input terminal (INM) of the comparator 42 and the connection node of the drain of the p-channel transistor MP2, the gate of the p-channel transistor MP3 and the drain of the n-channel transistor MN2. A switch SW2 is connected between the non-inverting input terminal (INP) of the comparator 42 and a connection node between the gates of the p-channel transistors MP1 and MP2, the drain of the p-channel transistor MP1, and the drain of the n-channel transistor MN1. The switches SW1 and SW2 are switches controlled by a control signal supplied from the timing generator 70, and may be configured by n-channel transistors, for example.

As illustrated in FIG. 3, the comparator 44 has the same circuit configuration as the comparator 42. For convenience of description later, the output terminal of the comparator 42 is denoted by reference numeral OUT1, and the output terminal of the comparator 44 is denoted by reference numeral OUT2.

Gates of the n-channel transistors MN3 and MN4 of the comparator 42 are connected to the current source circuit 40*a*. The current source circuit 40*a* includes a current source 58*a* and an n-channel transistor MN5. One terminal of the current source 58*a* is connected to a power supply voltage node. The other terminal of the current source 58*a* is connected to a drain and a gate of the n-channel transistor MN5. A source of the n-channel transistor MN5 is connected to the reference voltage node. A connection node between the current source 58*a* and the drain and gate of the n-channel transistor MN5 is an output terminal of the current source circuit 40*a* connected to the gates of the n-channel transistors MN3 and MN4 of the comparator 42.

Gates of the n-channel transistors MN3 and MN4 of the comparator 44 are connected to the current source circuit 40*b*. The current source circuit 40*b* includes a current source 58*b* and an n-channel transistor MN6. One terminal of the current source 58*b* is connected to a power supply voltage node. The other terminal of the current source 58*b* is connected to a drain and a gate of the n-channel transistor MN6. A source of the n-channel transistor MN6 is connected to the reference voltage node. A connection node between the current source 58*b* and the drain and gate of the n-channel transistor MN6 is an output terminal of the current source circuit 40*b* connected to the gates of the n-channel transistors MN3 and MN4 of the comparator 44.

In each of the comparators 42 and 44, the n-channel transistors MN1, MN2, MN3 and the p-channel transistors MP1, MP2, MP3 constitute a differential amplifier circuit. The gate of the n-channel transistor MN1 is the positive-side input terminal of the differential amplifier circuit, and the gate of the n-channel transistor MN2 is the negative-side input terminal of the differential amplifier circuit. A node connecting the gate of the p-channel transistor MP1, the gate of the p-channel transistor MP2, the drain of the p-channel transistor MP1, and the drain of the n-channel transistor MN1 is a negative-side output terminal of the differential amplifier circuit. A connection node between the drain of the p-channel transistor MP2 and the drain of the n-channel transistor MN2 is a positive-side output terminal of the differential amplifier circuit. The n-channel transistor MN3 constitutes a tail current source of the differential amplifier circuit.

In each of the comparators 42 and 44, the p-channel transistor MP3 and the n-channel transistor MN4 constitute a common source amplifier circuit. The gate of the p-channel transistor MP3 is an input terminal of the common source amplifier circuit, and the connection node between the drain of the p-channel transistor MP3 and the drain of the n-channel transistor MN4 is the output terminal of the common source amplifier circuit. The n-channel transistor MN4 constitutes a tail current source of the common source amplifier circuit. The input terminal of the common source amplifier circuit is connected to a positive-side output terminal of the differential amplifier circuit. The output terminal of the common source amplifier circuit is the output terminal of the comparators 42 and 44.

Thus, each of the comparators 42 and 44 is constituted by a two-stage amplifier circuit including a differential amplifier circuit and a common source amplifier circuit connected to a subsequent stage of the differential amplifier circuit.

Each of the n-channel transistors MN3 and MN4 of the comparator 42 forms a current mirror circuit with the n-channel transistor MN5 of the current source circuit 40a, and operates as a constant current source (tail current source). Similarly, each of the n-channel transistors MN3 and MN4 of the comparator 44 forms a current mirror circuit with the n-channel transistor MN6 of the current source circuit 40b, and operates as a constant current source (tail current source).

Here, the current source circuits 40a and 40b are driven such that the current I1 is larger than the current I2, assuming that the current flowing through the n-channel transistor MN5 is I1 and the current flowing through the n-channel transistor MN6 is I2. Accordingly, the current flowing through the n-channel transistor MN3 of the comparator 42 becomes larger than the current flowing through the n-channel transistor MN3 of the comparator 44, and the slew rate of the comparator 42 becomes higher than the slew rate of the comparator 44. As a result, the inversion delay time of the comparator 42 becomes shorter than the inversion delay time of the comparator 44.

The current I1 flowing through the n-channel transistor MN5 of the current source circuit 40a and the current I2 flowing through the n-channel transistor MN6 of the current source circuit 40b may be configured to be controllable by the timing generator 70, or may be fixed values.

Switches SW1 and SW2 connected between the input node and the output node of the differential amplifier circuits of the comparators 42 and 44 are switches (reset switches) for determining auto-zero of the comparators 42 and 44. The switches SW1 and SW2 are controlled by a common control signal PSW.

Next, the operation of the photoelectric conversion device according to the present embodiment will be described with reference to FIG. 4. FIG. 4 illustrates the levels of the control signals PSEL, PRES, and PTX of the pixels 12 and 14, the control signals PSW of the switches SW1 and SW2, the signal VOUT of the output line 18, the reference signal Vramp, and the output signals (signal LAT) of the comparators 42 and 44. It is assumed that the transfer transistor M1, the reset transistor M2, the select transistor M4, and the switches SW1 and SW2 are turned on (conductive state) in response to a control signal of High level, and turned off (nonconductive state) in response to a control signal of Low level.

Immediately before time t1, control signals PSEL, PTX, and PSW are at a Low level, and control signal PRES is at a High level. The reset transistor M2 of each of the pixels 12 and 14 is turned on, and the node FD of each of the pixels 12 and 14 is reset to a reset level voltage (reset voltage) corresponding to the voltage Vdd.

At time t1, the vertical scanning circuit 20 controls the control signal PSEL from the Low level to the High level. Thereby, the select transistor M4 of each of the pixels 12 and 14 is turned on, and the amplifier transistor M3 of each of the pixels 12 and 14 is connected to the corresponding output line 18 via the corresponding select transistor M4. As a result, a bias current is supplied from the current source 22 to the amplifier transistor M3 via the output line 18 and the select transistor M4, and a signal corresponding to the reset voltage of the node FD is output to the output line 18 via the select transistor M4.

Similarly, at time t1, the timing generator 70 controls the control signal PSW from the Low level to the High level. Thus, the switches SW1 and SW2 of the column circuits 32 and 34 are turned on, and the comparators 42 and 44 are reset. More specifically, the offset voltages (the threshold voltages) of the comparators 42 and 44 are reset to a voltage corresponding to the potential difference between the signal VOUT and the reference signal Vramp when the switches SW1 and SW2 are switched from ON to OFF. The reference signal Vramp changes from the reset voltage to the offset voltage.

At subsequent time t2, the vertical scanning circuit 20 controls the control signal PRES from High level to Low level. Thereby, the reset transistor M2 of each of the pixels 12 and 14 is turned off, and the reset state of the node FD of each of the pixels 12 and 14 is released. When the control signal PRES transitions from High level to Low level, the potential of the node FD changes due to charge injection generated in the reset transistor M2, and the signal level of the output line 18 also changes accordingly. The signal output to the output line 18 after the reset transistor M2 is turned off is a pixel signal (noise signal) when the pixels 12 and 14 are in the reset state. This pixel signal is referred to as an N-signal.

At subsequent time t3, the timing generator 70 controls the control signal PSW from High level to Low level. Thus, the switches SW1 and SW2 are turned off, and the reset states of the comparators 42 and 44 are released. The N-signal is clamped to the capacitor C1 of the column circuits 32 and 34, and the offset voltage of the comparators 42 and 44 is clamped to the capacitor C2 of the column circuits 32 and 34. A difference between the level of the signal VOUT and the level of the reference signal Vramp at this time is referred to as a voltage VCL.

At subsequent time t4, the reference signal generation circuit 36 returns the level of the reference signal Vramp from the level of the offset voltage to the level of the reset voltage. Accordingly, the difference between the level of the signal VOUT of the output line and the level of the reference signal Vramp becomes smaller than the voltage VCL, and the outputs of the comparators 42 and 44 transition from the Low level to the High level.

From subsequent time t5, the reference signal generation circuit 36 monotonically decreases the level of the reference signal Vramp with lapse of time. Similarly, at time t5, the counter circuit 46 of the column circuits 32 and 34 starts counting pulses superimposed on the clock signal CLK. The comparators 42 and 44 compare the level of the signal input from the output line 18 to the inverting input terminal via the capacitor C1 with the level of the signal input from the signal line 54 to the non-inverting input terminal via the capacitor C2.

At subsequent time t6, it is assumed that the difference between the level of the signal VOUT of the output line and the level of the reference signal Vramp is larger than the voltage VCL. Then, the magnitude relation between the level of the signal input to the inverting input terminal of the comparator 42 or 44 via the capacitor C1 and the level of the signal input to the non-inverting input terminal of the comparator 42 or 44 via the capacitor C2 is reversed. Thus, the signals LAT output from the comparators 42 and 44 start to change from High level to Low level.

The comparator 42 has a constant delay time with respect to time t6. Accordingly, the signal LAT output from the comparator 42 becomes Low level at the timing of time t7 at which the signal LAT reaches the inversion threshold value, and the count operation in the counter circuit 46 is stopped (illustrated by a solid line in FIG. 4). The count value (n1) in the period from time t5 to time t7 is a digital signal (digital N-signal) obtained by performing AD conversion (N-conversion) on the analog signal (N-signal) output from the pixel 12. The digital N-signal thus generated is held in the memory unit 48 of the column circuit 32.

Like the comparator 42, the comparator 44 also has a constant delay time with respect to time t6. However, as described with reference to FIG. 3, since the current value of the tail current source of the comparator 44 is smaller than the current value of the tail current source of the comparator 42, the delay time of the comparator 44 is larger than the delay time of the comparator 42. As a result, the signal LAT output from the comparator 44 reaches the inversion threshold value at the timing of time t8, which is later than time t7, and becomes Low level, and the count operation in the counter circuit 46 is stopped (illustrated by a broken line in FIG. 4). The count value (n2) in the period from time t5 to time t8 is a digital signal (digital N-signal) obtained by performing AD conversion (N-conversion) on the analog signal (N-signal) output from the pixel 14. The digital N-signal thus generated is held in the memory unit 48 of the column circuit 34.

Thus, by using the two comparators 42 and 44 having different current values of the tail current source, the timing at which the digital N-signal obtained by converting the signal of the pixel 12 is output and the timing at which the digital N-signal obtained by converting the signal of the pixel 14 is output may be shifted.

At subsequent time t9, the reference signal generation circuit 36 ends the falling of the level of the reference signal Vramp and returns to the level of the reset voltage again.

In this way, the analog signals (N-signal) output from the pixels 12 and 14 to the output lines 18 are converted (AD converted) into a digital signal (digital N-signal) by the operation in the period from the time t4 to the time t9. The digital N-signal obtained in this way is a signal mainly including a component of characteristic variation for each column of the comparators 42 and 44. The digital N-signal may include noise when the node FD is reset by the reset transistor M2, offset signals of the comparators 42 and 44, and the like.

In the present embodiment, the count value n1 is a value of a digital signal obtained by performing AD conversion (N-conversion) on the N-signal output from the OB pixel (pixel 12), and the count value n2 is a value of a digital signal obtained by performing AD conversion (N-conversion) on the N-signal output from the effective pixel (pixel 14). The time at which the count value n1 is determined (time t7) is earlier than the time at which the count value n2 is determined (time t8).

Assume that this order is reversed, the count value n2 is determined first, and the count value n1 is determined thereafter. In this case, noise generated by the comparator 44 in the AD conversion of the pixel signal of the pixel 14 affects the AD conversion of the pixel signal of the pixel 12 performed thereafter, which may cause an error in the count value n1.

In this regard, in the present embodiment, since the count value n1 is determined first and then the count value n2 is determined, it is possible to reduce an error in the count value n1 caused by noise caused by the comparator 44 simultaneously inverting the count value n1.

On the other hand, in the present embodiment, there is a possibility that an error is caused in the count value n2 due to noise caused by simultaneous inversion of the comparator 42. However, the error occurring in the count value n2 is less likely to be a factor of deterioration in image quality than the error occurring in the count value n1. This is because the count value n1 serves as a reference of the black level, and therefore, when there is an influence of noise, it is erroneously determined that the reference level is shifted, whereas the count value n2 does not affect the reference level. Further, since the noise is a phenomenon that occurs in a state in which the effective pixel is irradiated with light, it is considered that the noise is not conspicuous due to the influence of the photoelectric conversion signal (optical shot noise or sensitivity variation) as a factor in which the image quality is less likely to deteriorate.

As described above, in the present embodiment, the value of the digital signal subjected to N-conversion by the comparator 42 and the value of the digital signal subjected to N-conversion by the comparator 44 are dispersed, and the digital signal subjected to N-conversion by the comparator 42 is output earlier than the digital signal subjected to N-conversion by the comparator 44. Therefore, it is possible to obtain a good image with less influence of noise.

During the period from subsequent time t10 to the time t11, the vertical scanning circuit 20 controls the control signal PTX from the Low level to the High level. As a result, the transfer transistor M1 of each of the pixels 12 and 14 is turned on, and charge held by the photoelectric conversion elements PD of each of the pixels 12 and 14 is transferred to the node FD. The node FD has a potential corresponding to the amount of charge transferred from the photoelectric conversion element PD by charge-voltage conversion by the floating diffusion capacitor. The amplifier transistor M3 outputs a pixel signal corresponding to the potential of the node FD to the output line 18 via the select transistor M4. The signal output to the output line 18 after the transfer transistor M1 is turned off is a pixel signal (photoelectric conversion signal) corresponding to the amount of charge generated by the photoelectric conversion element PD. Since the pixel signal includes an N-signal component in addition to a component corresponding to the amount of charge generated by the photoelectric conversion element PD, the pixel signal is expressed as an (S+N)-signal.

Accordingly, the level of the signal VOUT of the output line 18 connected to the pixel 14 decreases to a predetermined level corresponding to the amount of charge transferred from the photoelectric conversion element PD. On the other hand, since the photoelectric conversion element PD of the pixel 12 is shielded from light, the level of the signal VOUT of the output line 18 connected to the pixel 12 does not change. The pixel signal output to the output line 18 is input to the inverting input terminal of the comparator 42 or 44 via the capacitor C1 that clamps the N-signal.

From subsequent time t12, the reference signal generation circuit 36 monotonically decreases the level of the reference signal Vramp with lapse of time. Similarly, at time t12, the counter circuit 46 of the column circuits 32 and 34 starts counting pulses superimposed on the clock signal CLK. The comparators 42 and 44 compare the level of the signal input from the output line 18 to the inverting input terminal via the capacitor C1 with the level of the signal input from the signal line 54 to the non-inverting input terminal via the capacitor C2.

It is assumed that the difference between the level of the signal VOUT of the output line 18 connected to the pixel 12 and the level of the reference signal Vramp is larger than the voltage VCL at the subsequent time t13. Then, the magnitude relation between the level of the signal input to the inverting input terminal of the comparator 42 via the capacitor C1 and the level of the signal input to the non-inverting input terminal of the comparator 42 via the capacitor C2 is reversed. Thus, the signal LAT output from the comparator 42 starts to change from High level to Low level.

The comparator 42 has a constant delay time with respect to time t13. Accordingly, the signal LAT output from the comparator 42 becomes Low level at the timing of time t14 at which the signal LAT reaches the inversion threshold value, and the count operation in the counter circuit 46 is stopped (illustrated by a solid line in FIG. 4). The count value S1 (=n1+A1) in the period from time t12 to time t14 is a digital signal (digital S-signal) obtained by performing AD conversion (S-conversion) on the analog signal ((S+N)-signal) output from the pixel 12. The count value S1 is typically the same as the count value n1. The digital S-signal thus generated is held in the memory unit 48 of the column circuit 34.

At subsequent time t15, it is assumed that the difference between the level of the signal VOUT of the output line 18 connected to the pixel 14 and the level of the reference signal Vramp is larger than the voltage VCL. Then, the magnitude relation between the level of the signal input to the inverting input terminal of the comparator 44 via the capacitor C1 and the level of the signal input to the non-inverting input terminal of the comparator 44 via the capacitor C2 is reversed. Thus, the signal LAT output from the comparator 44 starts to change from High level to Low level.

The comparator 44 has a constant delay time with respect to time 15. As a result, the signal LAT output from the comparator 44 becomes a Low level at the timing of time t16 at which the signal LAT reaches the inversion threshold value, and the count operation in the counter circuit 46 is stopped (illustrated by a broken line in FIG. 4). The count value S2 (=n2+A2) in the period from time t12 to time t16 is a digital signal (digital S-signal) obtained by performing AD conversion (S-conversion) on the analog signal ((S+N)-signal) output from the pixel 14. The digital S-signal thus generated is held in the memory unit 48 of the column circuit 34.

At subsequent time t17, the reference signal generation circuit 36 ends the lowering of the level of the reference signal Vramp and boosts the reference signal Vramp to the level of the reset voltage again.

In this way, the analog signal ((S+N)-signal) output from the pixels 12 and 14 in each column is converted (AD-converted) into a digital signal (digital S-signal) by the operation from the time t10 to the time t17.

Thereafter, the horizontal scanning circuit 50 sequentially selects the memory unit 48 of the column circuit 32 or 34 of each column, and transfers the digital N-signal and the digital S-signal held by the memory unit 48 to the digital signal processing circuit 60 via the output line 52.

The digital signal processing circuit 60 performs difference processing between the digital S-signal and the digital N-signal. Thus, the noise component superimposed on the digital S-signal is removed, and a signal corresponding to the change in the signal VOUT may be acquired.

Since the delay time of the comparators 42 and 44 is a numerical value determined by a circuit constant, a current value, or the like, the delay time at the time of N-conversion is equal to the delay time at the time of S-conversion. Therefore, the influence of the delay time of the comparator 42 or 44 is canceled by performing the difference processing between the digital S-signal and the digital N-signal, and the value of the count values A1 and A2 after the difference processing becomes a value corresponding to the change of the signal VOUT independent of the delay time of the comparators 42 and 44.

Therefore, the image quality is not affected by the operation of dispersing the value of the digital signal subjected to N-conversion by the comparator 44 and the value of the digital signal subjected to N-conversion by the comparator 42, and outputting the digital signal subjected to N-conversion by the comparator 42 earlier than the digital signal subjected to N-conversion by the comparator 44.

Further, by outputting the AD conversion result of the pixel 14 (OB pixel) earlier than the AD conversion result of the pixel 14 (effective pixel), even if a step occurs between the level of the output signal of the pixel 12 and the level of the output signal of the pixel 14, this phenomenon may be corrected.

For example, a pixel row in which pixels 14 are arranged in all columns and a pixel row including pixels 12 and 14 are provided in the pixel array unit 10. Thus, when a step is generated between the level of the output signal of the pixel 12 in the row in which the pixels 12 and 14 are arranged and the level of the output signal of the pixel 14, a similar step is also generated in the level of the output signal of the pixel 14 in the row in which the pixel 14 is arranged. Therefore, by using the pixel signals in the row in which the pixels 14 are arranged, it is possible to correct the level difference between the level of the output signal of the pixel 12 and the level of the output signal of the pixel 14 occurring between the columns.

As described above, according to the present embodiment, noise caused by the simultaneous inversion of the output levels of the comparators 42 and 44 may be effectively suppressed. Thus, noise superimposed on the reference signal acquired from the pixel 12 may be reduced, and an image with good image quality may be acquired.

Although two types of comparators 42 and 44 having different delay times are used in the present embodiment, the types of comparators having different delay times are not limited to two types, and three or more types may be used. Also in this case, by configuring the AD conversion result of the OB pixel (pixel 14) to be output earlier than the AD conversion result of another pixel (pixel 14), the same effect as in the present embodiment can be obtained.

Alternatively, the current amount of the tail current source of each of the comparators 42 and 44 in each column may be changed analogously, and the delay times of the comparators 42 and 44 may be slightly different from each other in each column. With such a configuration, the same effect as in the present embodiment may be obtained.

Second Embodiment

Figure 5:
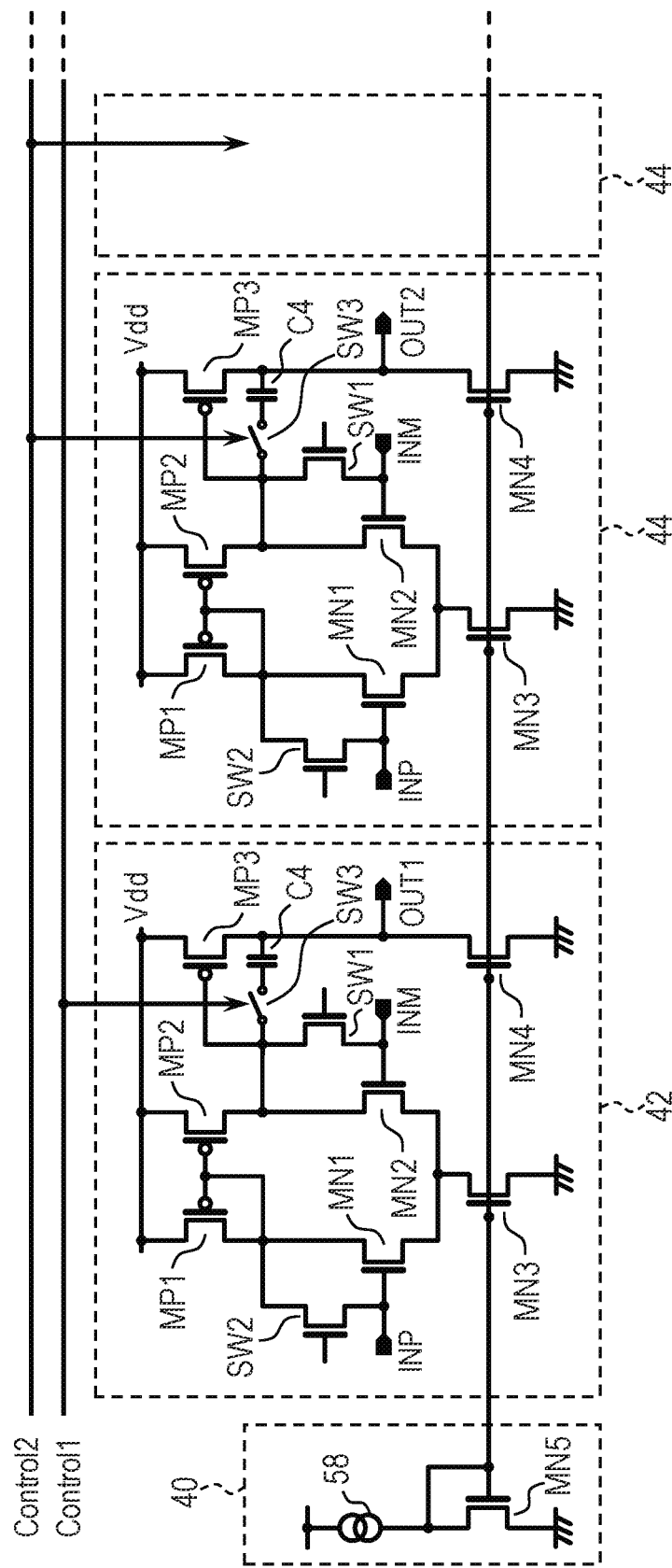
FIG. 5 is a circuit diagram illustrating a configuration example of a comparator in a photoelectric conversion device according to a second embodiment of the disclosure.

A photoelectric conversion device and a method of driving the same according to a second embodiment of the disclosure will be described with reference to FIG. 5. The same components as those in the first embodiment are denoted by the same reference numerals, and the description thereof will be omitted or simplified. FIG. 5 is a circuit diagram illustrating a configuration example of a comparator in the photoelectric conversion device according to the present embodiment.

The photoelectric conversion device according to the present embodiment differs from the photoelectric conversion device according to the first embodiment in the configurations of the comparators 42 and 44.

That is, in the comparators 42 and 44 of the photoelectric conversion device according to the present embodiment, as illustrated in FIG. 5, a switch SW3 and a capacitor C4 are connected in series between the positive-side output terminal of the differential amplifier circuit and the output terminal of the common source amplifier circuit. The switch SW3 of the comparator 42 is controlled by a control signal Control1 supplied from the timing generator 70. The switch SW3 of the comparator 44 is controlled by a control signal Control2 supplied from the timing generator 70.

Each of the n-channel transistors MN3 and MN4 of the comparators 42 and 44 of the photoelectric conversion device according to the present embodiment forms a current mirror circuit with the n-channel transistor MN5 of the current source circuit 40, and operates as a constant current source. The current flowing through the n-channel transistor MN3 of the comparator 42 and the current flowing through the n-channel transistor MN3 of the comparator 44 are the same. The current flowing through the n-channel transistor MN4 of the comparator 42 and the current flowing through the n-channel transistor MN4 of the comparator 44 are the same.

Other configurations of the photoelectric conversion device according to the present embodiment are the same as those of the photoelectric conversion device according to the first embodiment.

The capacitor C4 and the switch SW3 connected in series between the positive-side output terminal of the differential amplifier circuit of the comparators 42 and 44 and the output terminal of the common source amplifier circuit constitute a delay circuit capable of switching the delay time of the comparators 42 and 44. That is, the delay time of the comparators 42 and 44 may be changed by selecting whether or not the capacitor C4 is connected by the switch SW3. Instead of providing delay circuits capable of switching delay times in the comparators 42 and 44, a delay circuit may be selectively provided in the comparator 44.

In the present embodiment, it is assumed that the switch SW3 is turned on (conductive state) when the control signals Control1 and Control2 are at High level, and the capacitor C4 is connected (a large delay time). When the control signals Control1 and Control2 are at the Low level, the switch SW3 is turned off (non-conductive state), and the capacitor C4 is disconnected (a small delay time). In this case, by controlling the control signal Control1 to the Low level and controlling the control signal Control2 to the High level, the slew rate of the comparator 42 becomes higher than the slew rate of the comparator 44. That is, the delay time of the comparator 44 is longer than the delay time of the comparator 42.

Thus, similarly to the case where the current value of the tail current source of the comparator 42 is larger than the current value of the tail current source of the comparator 44 in the first embodiment, the AD conversion of the pixel signal of the OB pixel may be completed prior to the AD conversion of the pixel signal of the effective pixel. Therefore, good image quality with less influence of noise may be obtained.

As described above, according to the present embodiment, noise caused by the simultaneous inversion of the output levels of the comparators 42 and 44 may be effectively suppressed. Thus, noise superimposed on the reference signal acquired from the pixel 12 may be reduced, and an image with good image quality may be acquired.

Although the delay time of the comparators 42 and 44 is controlled by using the capacitor C4 in the present embodiment, the method of controlling the delay time of the comparators 42 and 44 is not limited to this. For example, the delay time may be controlled by varying the interconnection resistances and/or the threshold voltages of the transistors with the comparators 42 and 44. Further, the arrangement of the capacitor is not limited to the present embodiment, and a delay circuit may be formed using a capacitor for GND or a power supply.

Although two types of comparators 42 and 44 having different delay times are used in the present embodiment, the types of comparators having different delay times are not limited to two types, and three or more types may be used. Also in this case, by configuring the AD conversion result of the OB pixel (pixel 14) to be output earlier than the AD conversion result of other pixels, the same effect as in the present embodiment may be obtained.

Third Embodiment

Figure 6:
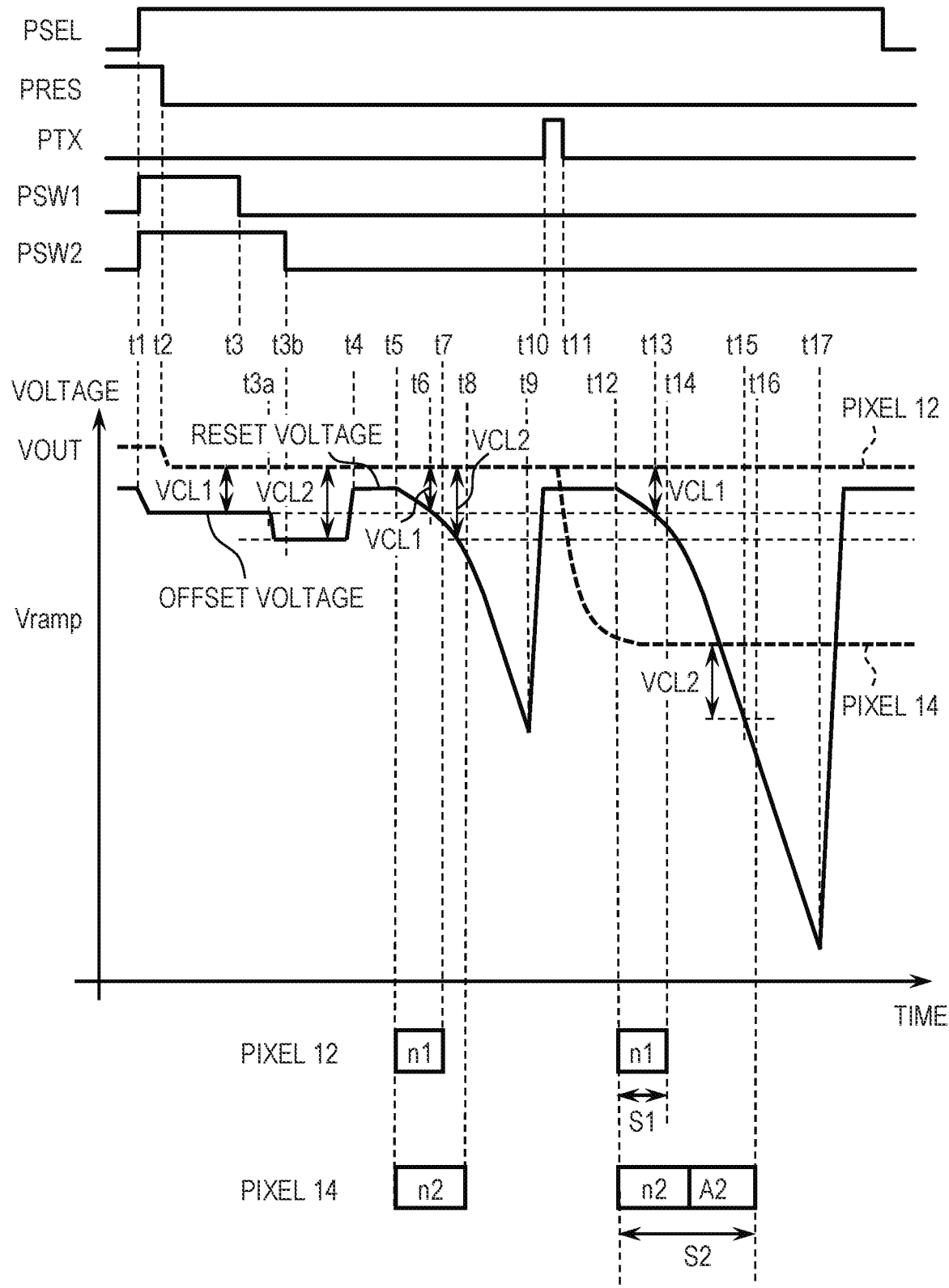
FIG. 6 is a timing chart illustrating the operation of the photoelectric conversion device according to a third embodiment of the disclosure.

A method of driving a photoelectric conversion device according to a third embodiment of the disclosure will be described with reference to FIG. 6. The same components as those in the first embodiment are denoted by the same reference numerals, and the description thereof will be omitted or simplified. FIG. 6 is a timing chart illustrating the operation of the photoelectric conversion device according to the present embodiment.

In the present embodiment, another method of driving the photoelectric conversion device according to the first embodiment will be described.

In the first embodiment, the switches SW1 and SW2 connected to the comparator 44 and the switches SW1 and SW2 connected to the comparator 42 are driven at the same timing. In the present embodiment, the switches SW1 and SW2 connected to the comparator 44 and the switches SW1 and SW2 connected to the comparator 42 are driven at different timings.

FIG. 6 illustrates the levels of the control signals PSEL, PRES, and PTX of the pixels 12 and 14, the control signal PSW1 of the switch of the comparator 42, the control signal PSW2 of the switch of the comparator 44, the signal VOUT of the output line 18, and the reference signal Vramp.

Immediately before time t1, control signals PSEL, PTX, PSW1, and PSW2 are at a Low level, and control signal PRES is at a High level. The reset transistor M2 of each of the pixels 12 and 14 is turned on, and the node FD of each of the pixels 12 and 14 is reset to a reset level voltage (reset voltage) corresponding to the voltage Vdd.

At time t1, the vertical scanning circuit 20 controls the control signal PSEL from the Low level to the High level. Thereby, the select transistor M4 of each of the pixels 12 and 14 is turned on, and the amplifier transistor M3 of each of the pixels 12 and 14 is connected to the corresponding output line 18 via the corresponding select transistor M4. As a result, a bias current is supplied from the current source 22 to the amplifier transistor M3 via the output line 18 and the select transistor M4, and a signal corresponding to the reset voltage of the node FD is output to the output line 18 via the select transistor M4.

Similarly, at time t1, the timing generator 70 controls the control signals PSW1 and PSW2 from the Low level to the High level. Thus, the switches SW1 and SW2 of the column circuits 32 and 34 are turned on, and the comparators 42 and 44 are reset. The reference signal Vramp changes from the reset voltage to the offset voltage.

At subsequent time t2, the vertical scanning circuit 20 controls the control signal PRES from High level to Low level. Thereby, the reset transistor M2 of each of the pixels 12 and 14 is turned off, and the reset state of the node FD of each of the pixels 12 and 14 is released. Thus, a pixel signal (N-signal) when the pixels 12 and 14 are in the reset state is output to the output line 18.

At subsequent time t3, the timing generator 70 controls the control signal PSW1 from High level to Low level. Thereby, the switches SW1 and SW2 of the comparator 42 are turned off, and the reset state of the comparator 42 is released. The N-signal of the pixel 14 is clamped to the capacitor C1 of the column circuit 32, and the voltage VCL1 is clamped to the capacitor C2 of the column circuit 32.

At subsequent time t3a, the reference signal generation circuit 36 controls the level of the reference signal Vramp so that the difference between the level of the reference signal Vramp and the signal VOUT becomes the voltage VCL2 larger than the voltage VCL1.

At subsequent time t3b, the timing generator 70 controls the control signal PSW2 from High level to Low level. Thereby, the switches SW1 and SW2 of the comparator 44 are turned off, and the reset state of the comparator 44 is released. The N-signal of the pixel 14 is clamped to the capacitor C1 of the column circuit 34, and the voltage VCL2 is clamped to the capacitor C2 of the column circuit 34.

At subsequent time t4, the reference signal generation circuit 36 returns the level of the reference signal Vramp to the level of the reset voltage. Accordingly, the voltage of the non-inverting input terminals of the comparators 42 and 44 becomes higher than the voltage of the inverting input terminal, and the outputs of the comparators 42 and 44 transition from the Low level to the High level.

Thereafter, in a period from time t5 to time t9, the AD conversion of the N-signal is performed as in the first embodiment.

At time t6, it is assumed that the difference between the level of the signal VOUT of the output line and the level of the reference signal Vramp is greater than the voltage VCL1. Then, the magnitude relation between the level of the signal input to the inverting input terminal of the comparator 42 via the capacitor C1 and the level of the signal input to the non-inverting input terminal of the comparator 42 via the capacitor C2 is reversed. Thus, at time t7 after the predetermined delay time from time t6, the signal LAT output from the comparator 42 transitions from High level to Low level, and the count value (n1) in the period from time t5 to time t7 is held in the memory unit 48 of the column circuit 32.

Further, it is assumed that the difference between the level of the signal VOUT of the output line and the level of the reference signal Vramp is larger than the voltage VCL2 at a timing after the time t6. Then, the magnitude relation between the level of the signal input to the inverting input terminal of the comparator 44 via the capacitor C1 and the level of the signal input to the non-inverting input terminal of the comparator 44 via the capacitor C2 is reversed. Thus, at time t8 after the predetermined delay time, the signal LAT output from the comparator 44 transitions from High level to Low level, and the count value (n2) in the period from time t5 to time t8 is held in the memory unit 48 of the column circuit 34.

As described above, in the present embodiment, the voltage VCL2 to be clamped to the capacitor C2 of the column circuit 34 is made larger than the voltage VCL1 to be clamped to the capacitor C2 of the column circuit 32, so that the timing at which the comparator 44 inverts is made later than the timing at which the comparator 42 inverts.

Thus, similarly to the case where the current value of the tail current source of the comparator 42 is larger than the current value of the tail current source of the comparator 44 in the first embodiment, the AD conversion of the pixel signal of the OB pixel may be completed prior to the AD conversion of the pixel signal of the effective pixel. Therefore, good image quality with less influence of noise may be obtained.

As described above, according to the present embodiment, noise caused by the simultaneous inversion of the output levels of the comparators 42 and 44 may be effectively suppressed. Thus, noise superimposed on the reference signal acquired from the pixel 12 may be reduced, and an image with good image quality may be acquired.

Fourth Embodiment

Figure 7:
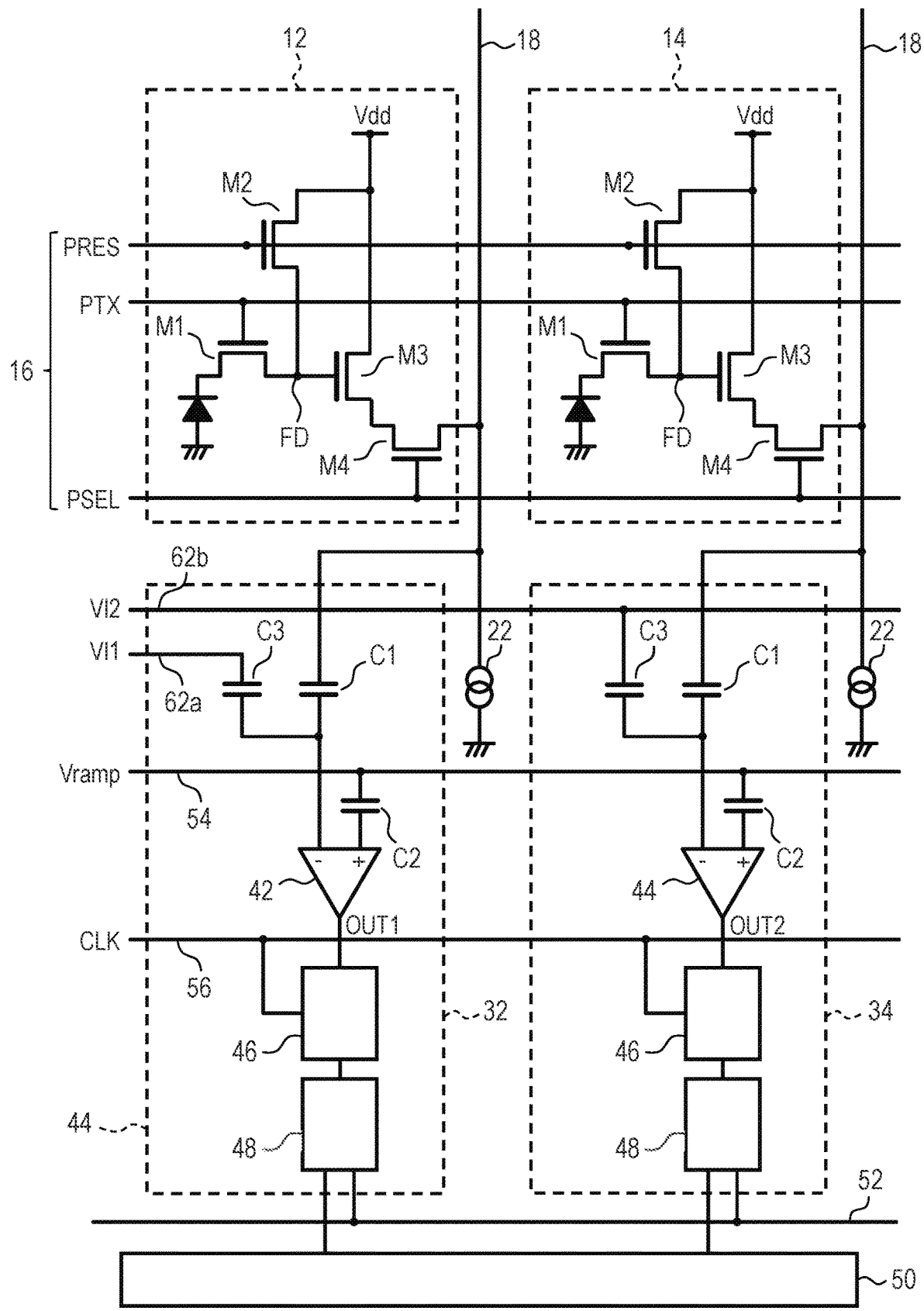
FIG. 7 is a circuit diagram illustrating a configuration example of a pixel and a column circuit in a photoelectric conversion device according to a fourth embodiment of the disclosure.
Figure 8:
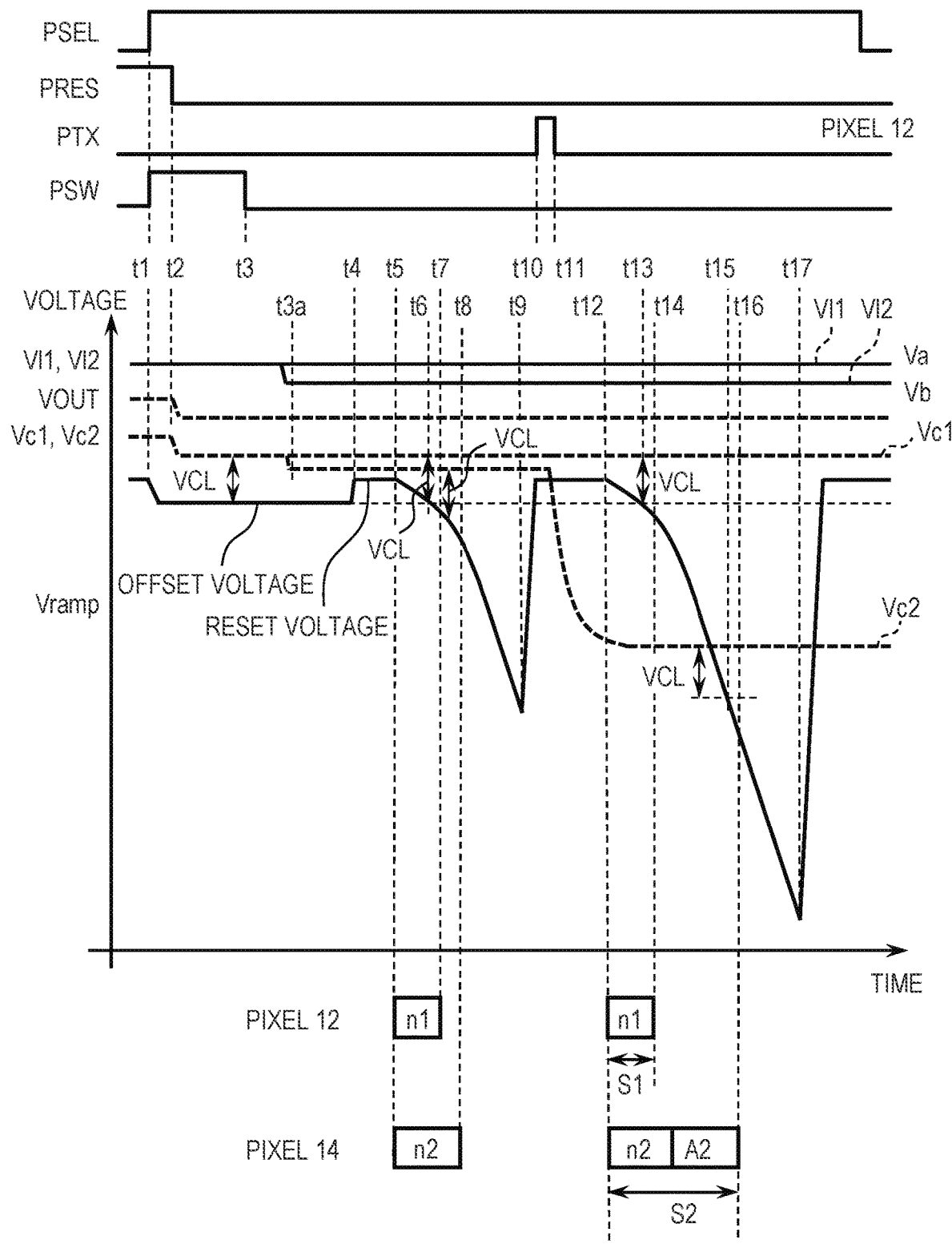
FIG. 8 is a timing chart illustrating the operation of the photoelectric conversion device according to the fourth embodiment of the disclosure.

A photoelectric conversion device and a method of driving the same according to a fourth embodiment of the disclosure will be described with reference to FIG. 7 and FIG. 8. The same components as those in the first embodiment are denoted by the same reference numerals, and the description thereof will be omitted or simplified. FIG. 7 is a circuit diagram illustrating a configuration example of a pixel and a column circuit in the photoelectric conversion device according to the present embodiment. FIG. 8 is a timing chart illustrating the operation of the photoelectric conversion device according to the present embodiment.

The photoelectric conversion device according to the present embodiment differs from the photoelectric conversion device according to the first embodiment in the configuration of the column circuits 32 and 34. That is, as illustrated in FIG. 7, the column circuits 32 and 34 of the photoelectric conversion device according to the present embodiment further include a capacitor C3.

One electrode of the capacitor C3 of the column circuit 32 is connected to the inverting input terminal of the comparator 42. The other electrode of the capacitor C3 of the column circuit 32 is connected to the timing generator 70 via a signal line 62a. The signal line 62a is supplied with a signal Vl1 from the timing generator 70.

One electrode of the capacitor C3 of the column circuit 34 is connected to the inverting input terminal of the comparator 44. The other electrode of the capacitor C3 of the column circuit 34 is connected to the timing generator 70 via a signal line 62b. The signal line 62b is supplied with a signal Vl2 from the timing generator 70.

Other configurations of the photoelectric conversion device according to the present embodiment are the same as those of the photoelectric conversion device according to the first embodiment.

Next, the operation of the photoelectric conversion device according to the present embodiment will be described with reference to FIG. 8. FIG. 8 illustrates the levels of the control signals PSEL, PRES, and PTX of the pixels 12 and 14, the control signals PSW of the switches SW1 and SW2, and the signals Vl1 and Vl2. FIG. 8 illustrates the signal VOUT of the output line 18, the voltage Vc1 of the inverting input terminal of the comparator 42, the voltage Vc2 of the inverting input terminal of the comparator 44, and the level of the reference signal Vramp.

Immediately before time t1, control signals PSEL, PTX, and PSW are at a Low level, and control signal PRES is at a High level. The reset transistor M2 of each of the pixels 12 and 14 is turned on, and the node FD of each of the pixels 12 and 14 is reset to a reset level voltage (reset voltage) corresponding to the voltage Vdd. The signal Vl1 of the signal line 62a and the signal Vl2 of the signal line 62b are both the voltage Va.

At time t1, the vertical scanning circuit 20 controls the control signal PSEL from the Low level to the High level. Thereby, the select transistor M4 of each of the pixels 12 and 14 is turned on, and the amplifier transistor M3 of each of the pixels 12 and 14 is connected to the corresponding output line 18 via the corresponding select transistor M4. As a result, a bias current is supplied from the current source 22 to the amplifier transistor M3 via the output line 18 and the select transistor M4, and a signal corresponding to the reset voltage of the node FD is output to the output line 18 via the select transistor M4.

Similarly, at time t1, the timing generator 70 controls the control signal PSW from the Low level to the High level. Thus, the switches SW1 and SW2 of the column circuits 32 and 34 are turned on, and the comparators 42 and 44 are reset. The reference signal Vramp changes from the reset voltage to the offset voltage.

At subsequent time t2, the vertical scanning circuit 20 controls the control signal PRES from High level to Low level. Thereby, the reset transistor M2 of each of the pixels 12 and 14 is turned off, and the reset state of the node FD of each of the pixels 12 and 14 is released. Thus, a pixel signal (N-signal) when the pixels 12 and 14 are in the reset state is output to the output line 18.

At a subsequent time t3, the timing generator 70 controls the control signal PSW from High level to Low level. Thereby, the switches SW1 and SW2 of the comparators 42 and 44 are turned off, and the reset state of the comparators 42 and 44 is released. The N-signal of the pixel 14 is clamped to the capacitor C1 of the column circuits 32 and 34, and the voltage VCL is clamped to the capacitor C2 of the column circuits 32 and 34.

At subsequent time t3a, the timing generator 70 controls the level of the signal Vl2 of the signal line 62b from the voltage Va to a voltage Vb lower than the voltage Va. The voltage Vc2 of the inverting input terminal of the comparator 44 also decreases in response to the voltage change of the signal Vl2. Since the signal Vl1 remains at the voltage Va, the voltage Vc1 at the inverting input terminal of the comparator 42 does not change.

At subsequent time t4, the reference signal generation circuit 36 returns the level of the reference signal Vramp to the level of the reset voltage. Accordingly, the voltage of the non-inverting input terminals of the comparators 42 and 44 becomes higher than the voltage of the inverting input terminal, and the outputs of the comparators 42 and 44 transition from the Low level to the High level.

Thereafter, in a period from time t5 to time t9, the AD conversion of the N-signal is performed as in the first embodiment.

At time t6, it is assumed that the difference between the level of the voltage Vc1 and the level of the reference signal Vramp becomes larger than the voltage VCL, and the difference between the levels of the signals input to the inverting input terminal and the non-inverting input terminal of the comparator 42 exceeds the inverting threshold value of the comparator 42. Thus, at time t7 after the predetermined delay time from time t6, the signal LAT output from the comparator 42 transitions from High level to Low level, and the count value (n1) in the period from time t5 to time t7 is held in the memory unit 48 of the column circuit 32.

At a timing after the time t6, it is assumed that the difference between the level of the voltage Vc2 and the level of the reference signal Vramp becomes larger than the voltage VCL, and the difference between the levels of the signals input to the inverting input terminal and the non-inverting input terminal of the comparator 44 exceeds the inverting threshold value of the comparator 44. Thus, at time t8 after the predetermined delay time, the signal LAT output from the comparator 44 transitions from High level to Low level, and the count value (n2) in the period from time t5 to time t8 is held in the memory unit 48 of the column circuit 34.

As described above, in the present embodiment, by making the voltage of the inverting input terminal of the comparator 44 lower than the voltage of the inverting input terminal of the comparator 42, the timing at which the comparator 44 inverts is made later than the timing at which the comparator 42 inverts.

Thus, similarly to the case where the current value of the tail current source of the comparator 42 is larger than the current value of the tail current source of the comparator 44 in the first embodiment, the AD conversion of the pixel signal of the OB pixel may be completed prior to the AD conversion of the pixel signal of the effective pixel. Therefore, good image quality with less influence of noise may be obtained.

As described above, according to the present embodiment, noise caused by the simultaneous inversion of the output levels of the comparators 42 and 44 may be effectively suppressed. Thus, noise superimposed on the reference signal acquired from the pixel 12 may be reduced, and an image with good image quality may be acquired.

Although the voltage of the inverting input terminal of the comparator 44 is controlled to be lower than the voltage of the inverting input terminal of the comparator 42 in the present embodiment, the voltage of the inverting input terminal of the comparator 42 may be controlled to be higher than the voltage of the inverting input terminal of the comparator 44. Alternatively, the voltage of the inverting input terminal of the comparator 42 and the voltage of the inverting input terminal of the comparator 44 may be controlled so that the voltage of the inverting input terminal of the comparator 42 is lower than the voltage of the inverting input terminal of the comparator 44.

Fifth Embodiment

Figure 9:
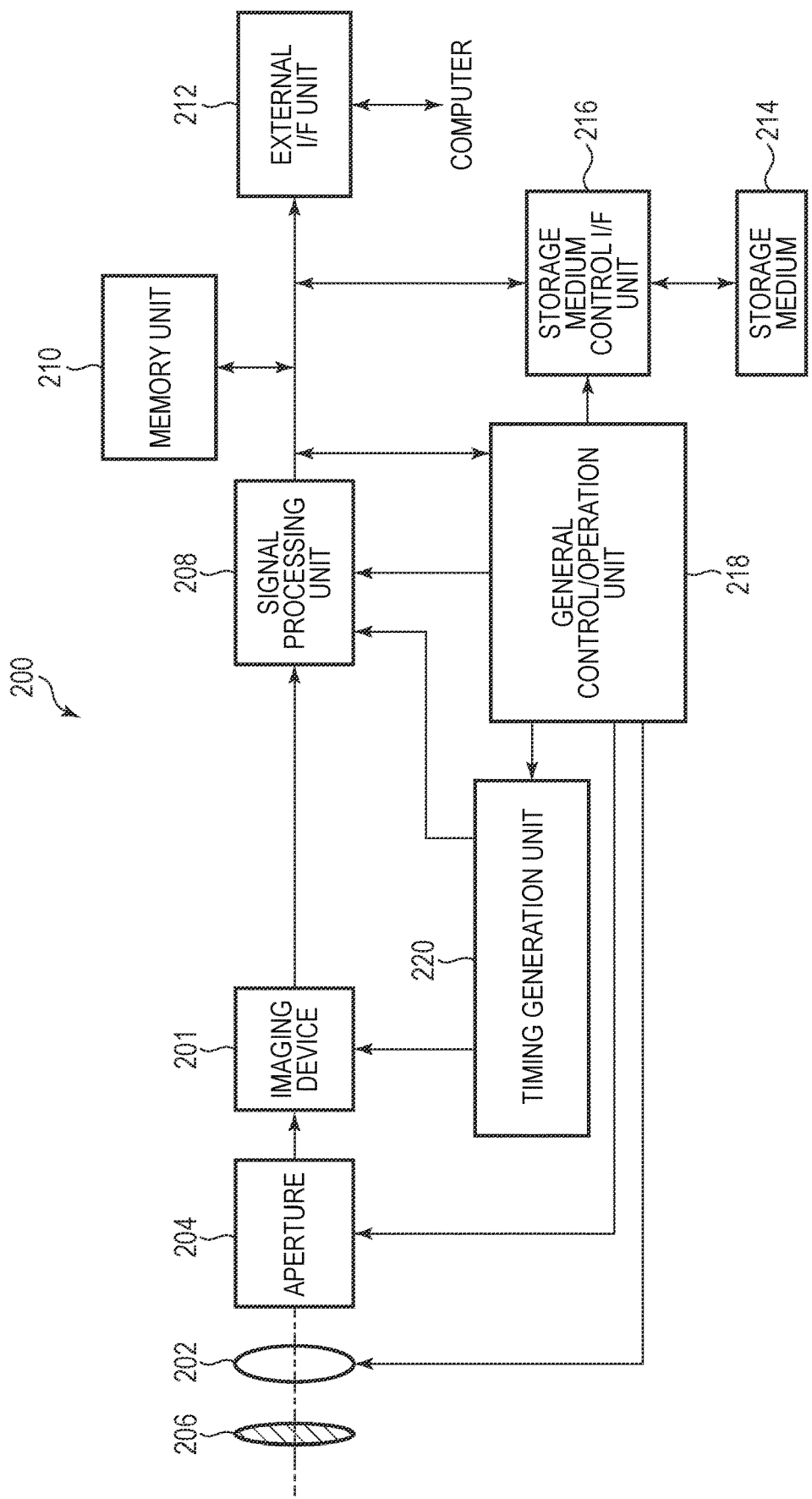
FIG. 9 is a block diagram illustrating a schematic configuration of an imaging system according to a fifth embodiment of the disclosure.

An imaging system according to a fifth embodiment of the disclosure will be described with reference to FIG. 9. FIG. 9 is a block diagram illustrating a schematic configuration of an imaging system according to the present embodiment.

The photoelectric conversion device 100 described in the first to fourth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 9 illustrates a block diagram of a digital still camera as an example of them.

The imaging system 200 illustrated in FIG. 9 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 are an optical system for focusing light on the imaging device 201. The imaging device 201 is the photoelectric conversion device 100 described in any of the first to fourth embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a memory unit 210 that temporarily stores image data, and an external interface unit (external I/F unit) 212 that communicates with an external computer or the like. The imaging system 200 further includes a storage medium 214 such as a semiconductor memory for storing or reading out imaging data, and a storage medium control interface unit (storage medium control I/F unit) 216 for storing or reading out imaging data on or from the storage medium 214. The storage medium 214 may be built in the imaging system 200 or may be detachable.

The imaging system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, an imaging system to which the photoelectric conversion device 100 according to the first to fourth embodiments is applied may be realized.

Sixth Embodiment

Figure 10A:
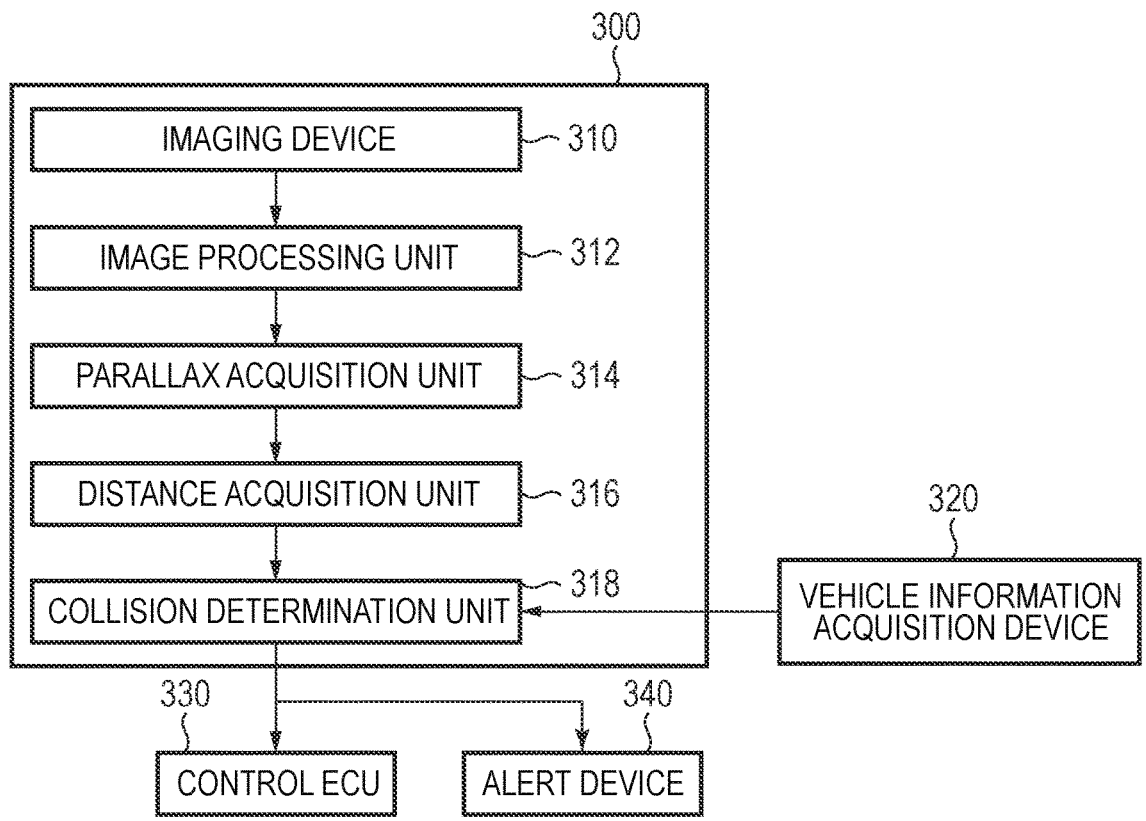
FIG. 10A is a diagram illustrating a configuration example of an imaging system according to a sixth embodiment of the disclosure.
Figure 10B:
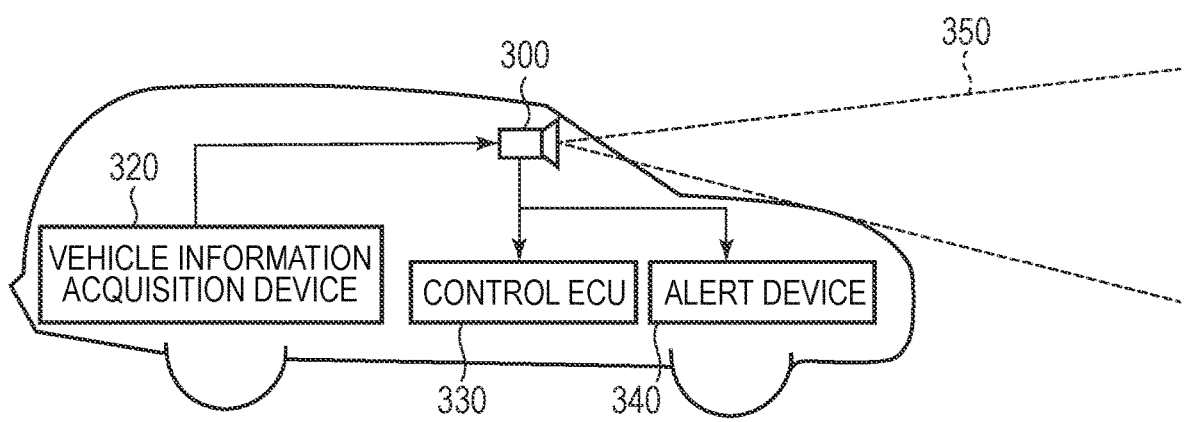
FIG. 10B is a diagram illustrating a configuration example of a movable object according to a sixth embodiment of the disclosure.

An imaging system and a movable object according to a sixth embodiment of the disclosure will be described with reference to FIG. 10A and FIG. 10B. FIG. 10A is a diagram illustrating a configuration of an imaging system according to the present embodiment. FIG. 10B is a diagram illustrating a configuration of a movable object according to the present embodiment.

FIG. 10A illustrates an example of an imaging system related to an in-vehicle camera. The imaging system 300 includes an imaging device 310. The imaging device 310 is the photoelectric conversion device 100 according to any one of the first to fourth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to an object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition means may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 10B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the disclosure is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the aspect of the embodiments may be applied not only to a movable object but also to an apparatus using object recognition in a wide range such as an intelligent transport system (ITS).

Seventh Embodiment

Figure 11:
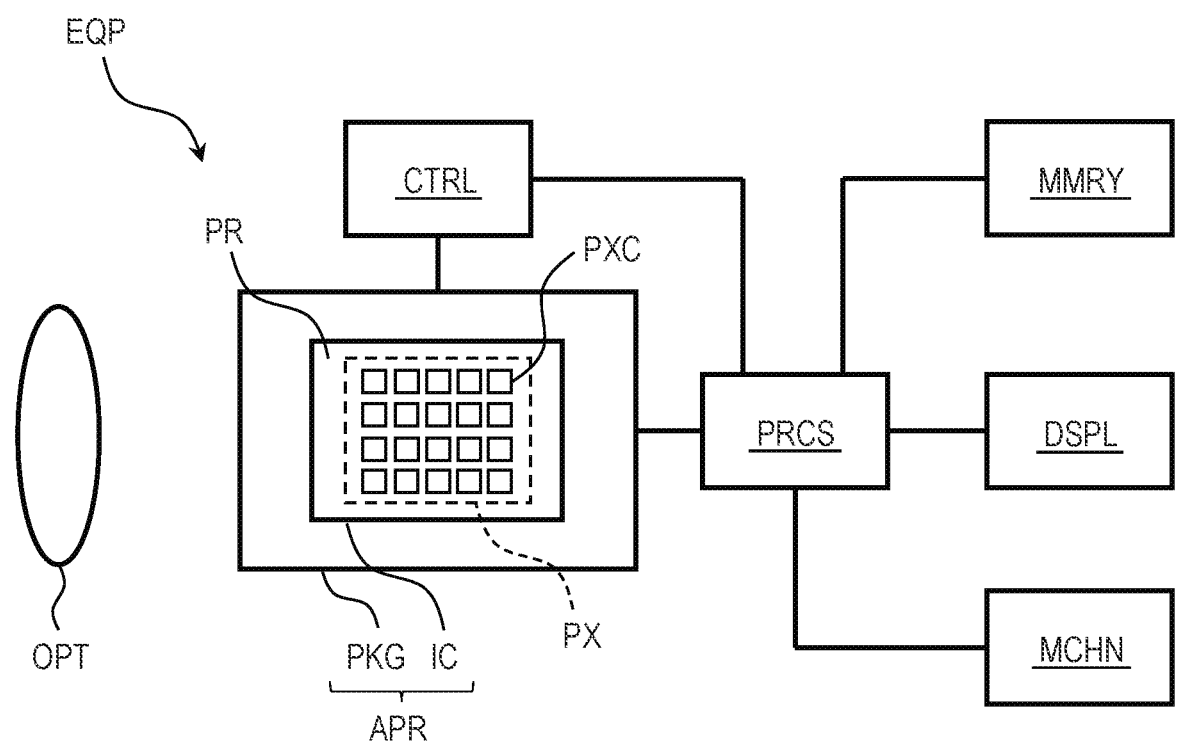
FIG. 11 is a block diagram illustrating a schematic configuration of equipment according to a seventh embodiment of the disclosure.

Equipment according to a seventh embodiment of the disclosure will be described with reference to FIG. 11. FIG. 11 is a block diagram illustrating a schematic configuration of equipment according to the present embodiment.

FIG. 11 is a schematic diagram illustrating equipment EQP including the photoelectric conversion device APR. The photoelectric conversion device APR has a function of the photoelectric conversion device 100 according to any one of the first to fourth embodiments. All or part of the photoelectric conversion device APR may be a semiconductor device IC. The photoelectric conversion device APR of this example may be used as, for example, an image sensor, an AF (Auto Focus) sensor, a photometric sensor, or a distance measuring sensor. The semiconductor device IC includes a pixel area PX in which pixel circuits PXC including photoelectric converters are arranged in a matrix. The semiconductor device IC may have a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric converters and a second semiconductor chip provided with peripheral circuits are stacked. Each of the peripheral circuits in the second semiconductor chip may be a column circuit corresponding to a pixel column of the first semiconductor chip. The peripheral circuits in the second semiconductor chip may be matrix circuits corresponding to pixels or pixel blocks of the first semiconductor chip. As the connection between the first semiconductor chip and the second semiconductor chip, an inter-chip wiring by direct bonding of a through electrode (TSV) and a conductor such as copper, a connection by microbumps between chips, a connection by wire bonding, or the like may be employed.

The photoelectric conversion device APR may include, in addition to the semiconductor device IC, a package PKG accommodating the semiconductor device IC. The package PKG may include a base body to which the semiconductor device IC is fixed, a lid body such as glass facing the semiconductor device IC, and a connecting member such as a bonding wire or a bump connecting a terminal provided on the base body and a terminal provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is a semiconductor device such as an ASIC. The processing device PRCS processes a signal output from the photoelectric conversion device APR, and constitutes an AFE (analog front end) or a DFE (digital front end). The processing device PRCS is a semiconductor device such as a central processing unit (CPU) or an application specific integrated circuit (ASIC). The display device DSPL is an EL display device or a liquid crystal display device that displays information (image) obtained by the photoelectric conversion device APR. The storage device MMRY is a magnetic device or a semiconductor device that stores information (image) obtained by the photoelectric conversion device APR. The storage device MMRY is a volatile memory such as an SRAM or a DRAM, or a nonvolatile memory such as a flash memory or a hard disk drive. The mechanical device MCHN has a movable portion or a propulsion portion such as a motor or an engine. In the equipment EQP, a signal output from the photoelectric conversion device APR is displayed on the display device DSPL, or transmitted to the outside by a communication device (not illustrated) included in the equipment EQP. To this end, in one embodiment, the equipment EQP further includes a storage device MMRY and a processing device PRCS in addition to a storage circuit unit and an arithmetic circuit unit included in the photoelectric conversion device APR.

The equipment EQP illustrated in FIG. 11 may be an electronic device such as an information terminal (e.g., a smartphone or a wearable terminal) having a photographing function or a camera (For example, an interchangeable lens camera, a compact camera, a video camera, and a surveillance camera.). The mechanical device MCHN in the camera may drive components of the optical device OPT for zooming, focusing, and shutter operation. The equipment EQP may be a transportation equipment (movable object) such as a vehicle, a ship, or an airplane. The equipment EQP may be a medical device such as an endoscope or a CT scanner. The equipment EQP may be a medical device such as an endoscope or a CT scanner.

The mechanical device MCHN in the transport device may be used as a mobile device. The equipment EQP as a transport device is suitable for transporting the photoelectric conversion device APR or for assisting and/or automating driving (steering) by an imaging function. The processing device PRCS for assisting and/or automating driving (steering) may perform processing for operating the mechanical device MCHN as the mobile device based on information obtained by the photoelectric conversion device APR.

The photoelectric conversion device APR according to the present embodiment may provide a high value to the designer, the manufacturer, the seller, the purchaser, and/or the user. Therefore, when the photoelectric conversion device APR is mounted on the equipment EQP, the value of the equipment EQP may be increased. Therefore, when the equipment EQP is manufactured and sold, determining the mounting of the photoelectric conversion device APR of the present embodiment on the equipment EQP is beneficial in increasing the value of the equipment EQP.

Modified Embodiments

The disclosure is not limited to the above embodiments, and various modifications are possible.

For example, an example in which a configuration of a part of any embodiment is added to another embodiment or an example in which a configuration of a part of another embodiment is substituted is also an embodiment of the disclosure.

The circuit configuration of the pixels 12 and 14 illustrated in FIG. 2 is merely an example, and may be changed as appropriate. For example, each of the pixels 12 and 14 may include two or more photoelectric conversion elements. The pixels 12 and 14 do not necessarily have to include the select transistor M4.

Although the AD conversion result of the pixel 14 (OB pixel) is determined earlier than the AD conversion result of the pixel 12 (effective pixel) in the first to fourth embodiments, if a plurality of pixels 14 exist in one row, the AD conversion results of all the pixels 14 need not be determined earlier.

For example, AD conversion of the pixel 14 may be performed by the column circuit 32, AD conversion of a part of the pixel 12 may be performed by the column circuit 32, and AD conversion of another part of the pixel 12 may be performed by the column circuit 34. Even in such a case, if the number of pixels 12 subjected to AD conversion in the column circuit 34 is sufficiently larger than the number of pixels 12 subjected to AD conversion in the column circuit 32, the effect described in the above embodiment may be obtained.

Further, noise caused by the simultaneous inversion of the comparators 42 and 44 has a particularly large influence on adjacent columns. Therefore, if the AD conversion result of the pixel 14 is determined at least prior to the AD conversion result of the pixel 12 located in the vicinity of the pixel 14, the effect described in the above embodiment may be obtained.

Although the comparators 42 and 44 including the differential amplifier circuit and the common source amplifier circuit are described in the first to fourth embodiments, the circuit configuration of the comparators 42 and 44 is not limited to this. For example, the comparators 42 and 44 do not necessarily have to have a common source amplifier circuit, and may have a single-stage configuration of a differential amplifier circuit.

The imaging systems described in the fifth and sixth embodiments are examples of an imaging system to which the photoelectric conversion device of the disclosure can be applied, and the imaging system to which the photoelectric conversion device of the disclosure can be applied is not limited to the configurations illustrated in FIG. 9 and FIG. 10A.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-042595, filed Mar. 16, 2021, which is hereby incorporated by reference herein in its entirety.

What is claimed is:

1. A photoelectric conversion device comprising:
a pixel array unit in which a plurality of pixels each including a photoelectric conversion element are arranged to form a plurality of columns;
a plurality of AD conversion circuits provided corresponding to the plurality of columns; and
a control circuit configured to control the plurality of AD conversion circuits,
wherein the plurality of pixels includes a first pixel arranged in a first column of the plurality of columns and in which the photoelectric conversion element is shielded from light, and a second pixel arranged in a second column of the plurality of columns and in which light is incident on the photoelectric conversion element,
wherein the plurality of AD conversion circuits includes a first AD conversion circuit including a first comparator that receives a signal of the first pixel, and a second AD conversion circuit including a second comparator that receives a signal of the second pixel, and
wherein the control circuit is configured to control the first comparator and the second comparator such that a result of AD conversion by the first AD conversion circuit is determined earlier than a result of AD conversion by the second AD conversion circuit with respect to a signal of a same level,
wherein each of the first comparator and the second comparator is configured to compare a pixel signal output from a pixel in a corresponding column with a reference signal whose level changes with lapse of time, and to output a comparison signal indicating different levels depending on whether a difference between the pixel signal and the reference signal is smaller than a threshold voltage or larger than the threshold voltage, and
wherein the control circuit is configured to reset the first comparator and the second comparator such that a threshold voltage of the second comparator is larger than a threshold voltage of the first comparator when the AD conversion is performed on a signal of the first pixel and a signal of the second pixel.

2. The photoelectric conversion device according to claim 1, wherein the control circuit controls the first comparator and the second comparator such that a slew rate of the first comparator is higher than a slew rate of the second comparator when the AD conversion is performed on a signal of the first pixel and a signal of the second pixel.

3. The photoelectric conversion device according to claim 2,
wherein the first comparator and the second comparator each include a differential amplifier circuit, and
wherein the control circuit controls the first comparator and the second comparator such that a current value of a tail current source of the differential amplifier circuit of the first comparator is larger than a current value of a tail current source of the differential amplifier circuit of the second comparator.

4. The photoelectric conversion device according to claim 2,
wherein the first comparator and the second comparator each include a delay circuit configured to switch a slew rate, and
wherein the control circuit controls the delay circuit such that a slew rate of the first comparator is higher than a slew rate of the second comparator.

5. The photoelectric conversion device according to claim 1,
wherein a level of the reference signal when resetting the first comparator is different from a level of the reference signal when resetting the second comparator.

6. The photoelectric conversion device according to claim 1,
wherein each of the first comparator and the second comparator is configured to compare a pixel signal output from a pixel in a corresponding column with a reference signal whose level changes with lapse of time, and to output a comparison signal indicating different levels depending on whether a difference between the pixel signal and the reference signal is smaller than a threshold voltage or larger than the threshold voltage, and
wherein the control circuit is configured to control a level of a first input terminal of the first comparator receiving the pixel signal and a level of a first input terminal of the second comparator receiving the pixel signal such that a potential difference between the first input terminal and a second input terminal receiving the reference signal is larger in the second comparator than in the first comparator when the AD conversion is performed on a signal of the first pixel and a signal of the second pixel.

7. The photoelectric conversion device according to claim 1, wherein the first pixel and the second pixel are controlled simultaneously by a common control signal.

8. The photoelectric conversion device according to claim 1, wherein the first column and the second column are adjacent to each other.

9. An imaging system comprising:
the photoelectric conversion device according to claim 1; and
a signal processing unit that processes a signal output from the photoelectric conversion device.

10. A movable object comprising:
the photoelectric conversion device according to claim 1;
a distance information acquisition unit configured to acquire distance information to an object from a parallax image based on a signal from the photoelectric conversion device; and
a control unit configured to control the movable object based on the distance information.

11. Equipment comprising:
the photoelectric conversion device according to claim 1; and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

12. A photoelectric conversion device comprising:
a pixel array unit in which a plurality of pixels each including a photoelectric conversion element are arranged to form a plurality of columns; and
a plurality of AD conversion circuits provided corresponding to the plurality of columns,
wherein the plurality of pixels includes a first pixel arranged in a first column of the plurality of columns and in which the photoelectric conversion element is shielded from light, and a second pixel arranged in a second column of the plurality of columns and in which light is incident on the photoelectric conversion element,
wherein the plurality of AD conversion circuits includes a first AD conversion circuit including a first comparator that receives a signal of the first pixel, and a second AD conversion circuit including a second comparator that receives a signal of the second pixel, and
wherein a slew rate of the first comparator is higher than a slew rate of the second comparator.

13. The photoelectric conversion device according to claim 12,
wherein each of the first comparator and the second comparator includes a differential amplifier circuit, and
wherein a current value of a tail current source of the differential amplifier circuit of the first comparator is larger than a current value of a tail current source of the differential amplifier circuit of the second comparator.

14. The photoelectric conversion device according to claim 12, wherein each of the first comparator and the second comparator includes a delay circuit configured to switch a slew rate.

15. The photoelectric conversion device according to claim 12, wherein the second comparator includes a delay circuit for making the slew rate lower than the slew rate of the first comparator.

16. The photoelectric conversion device according to claim 14, wherein each of the first comparator and the second comparator includes a differential amplifier circuit and a common source amplifier circuit provided subsequent to the differential amplifier circuit, wherein the delay circuit is provided between an output terminal of the differential amplifier circuit and an input terminal of the common source amplifier circuit.

17. The photoelectric conversion device according to claim 12, wherein the first pixel and the second pixel are controlled simultaneously by a common control signal.

18. The photoelectric conversion device according to claim 12, wherein the first column and the second column are adjacent to each other.

19. An imaging system comprising:
the photoelectric conversion device according to claim 12; and
a signal processing unit that processes a signal output from the photoelectric conversion device.

20. A movable object comprising:
the photoelectric conversion device according to claim 12;
a distance information acquisition unit configured to acquire distance information to an object from a parallax image based on a signal from the photoelectric conversion device; and
a control unit configured to control the movable object based on the distance information.

21. Equipment comprising:
the photoelectric conversion device according to claim 12; and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

* * * * *